United States Patent
Liu et al.

(10) Patent No.: US 11,224,028 B2
(45) Date of Patent: Jan. 11, 2022

(54) COMMUNICATING PAGING INFORMATION IN WIRELESS COMMUNICATIONS

(71) Applicant: ZTE Corporation, Guangdong (CN)

(72) Inventors: Xing Liu, Guangdong (CN); Feng Bi, Guangdong (CN); Peng Hao, Guangdong (CN); Jianxun Ai, Guangdong (CN); Dapeng Li, Guangdong (CN); Dong Zhou, Guangdong (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 16/785,645

(22) Filed: Feb. 9, 2020

(65) Prior Publication Data
US 2020/0236646 A1 Jul. 23, 2020

Related U.S. Application Data

(63) Continuation of application No. PCT/CN2017/097179, filed on Aug. 11, 2017.

(51) Int. Cl.
*H04W 68/00* (2009.01)
*H04W 68/02* (2009.01)

(52) U.S. Cl.
CPC ......... *H04W 68/005* (2013.01); *H04W 68/02* (2013.01)

(58) Field of Classification Search
CPC . H04W 68/005; H04W 68/02; H04W 56/001; H04W 16/28; H04W 68/025; H04W 72/04; H04L 5/0053; H04L 5/0094; H04L 5/005; H04J 11/0069; H04B 7/0695
USPC .................. 455/426.1, 458, 515, 450–452.2; 370/252
See application file for complete search history.

(56) References Cited

U.S. PATENT DOCUMENTS

| | | | |
|---|---|---|---|
| 8,929,927 B1* | 1/2015 | Oroskar | H04W 68/02 455/458 |
| 2010/0165873 A1 | 7/2010 | Higuchi et al. | |
| 2016/0014718 A1* | 1/2016 | Mysore Balasubramanya | H04W 52/0219 455/458 |
| 2016/0205659 A1 | 7/2016 | Bergman et al. | |
| 2017/0280481 A1* | 9/2017 | Stern-Berkowitz | H04W 74/0833 |

(Continued)

FOREIGN PATENT DOCUMENTS

| | | |
|---|---|---|
| CN | 103428812 A | 12/2013 |
| CN | 104115513 A | 10/2014 |

(Continued)

OTHER PUBLICATIONS

International Search Report and Written Opinion dated May 10, 2018 for International Application No. PCT/CN2017/097179, filed on Aug. 11, 2017 (6 pages).

(Continued)

*Primary Examiner* — Michael Y Mapa
(74) *Attorney, Agent, or Firm* — Perkins Coie LLP

(57) ABSTRACT

Systems, devices, and techniques are described for performing paging in a wireless communication network. A method includes mapping a paging indication to one or more resource elements. The one or more resource elements are resources in one or more synchronization signal symbols that are not mapped by the synchronization signal. The method includes transmitting the paging indication to trigger a response from a user equipment for performing subsequent paging.

20 Claims, 16 Drawing Sheets

(56) References Cited

U.S. PATENT DOCUMENTS

2018/0199310 A1* 7/2018 Islam ................... H04L 5/0053
2018/0302182 A1* 10/2018 Ly ....................... H04L 27/2613

FOREIGN PATENT DOCUMENTS

| EP | 3627950 A1 | 3/2020 |
| WO | 2016/123435 A1 | 8/2016 |
| WO | 2017/039373 A1 | 3/2017 |
| WO | 2018/128884 A1 | 7/2018 |
| WO | 2018/128933 A1 | 7/2018 |

OTHER PUBLICATIONS

Panasonic, "Paging design for NR," 3GPP TSG RAN WG1 Meeting #88, Athens, Greece, R1-172761, pp. 1-4, Feb. 2017.
Panasonic, "Paging design for NR," 3GPP TSG RAN WG1 Meeting #88bis, Spokane, Washington, USA, R1-1705171, pp. 1-3, Apr. 2017.
Qualcomm Incorporated, "Paging design consideration," 3GPP TSG-RAN WG1 #88bis, Spokane, Washington, USA, R1-1705570, pp. 1-8, Apr. 2017.
ZTE, "Paging Design in NR," 3GPP TSG-RAN WG1 NR Ad-Hoc#2, Qingdao, P.R. China, R1-1709893, pp. 1-7, Jun. 2017.
Extended European Search Report for European Patent Application No. 17920642.0, dated Jun. 25, 2020 (12 pages).
Office Action for European Patent Application No. 17920642.0, dated Oct. 13, 2021 (6 pages).
Office Action for Chinese Patent Application No. 201780093859.3, dated Sep. 22, 2021 (17 pages).
Asustek, "Information carried on synchronization signal and broadcast channel," 3GPP TSG-RAN WG1, Meeting #83, Anaheim, U.S.A., R1 -157123, 3 pages, Nov. 15-22, 2015.

* cited by examiner

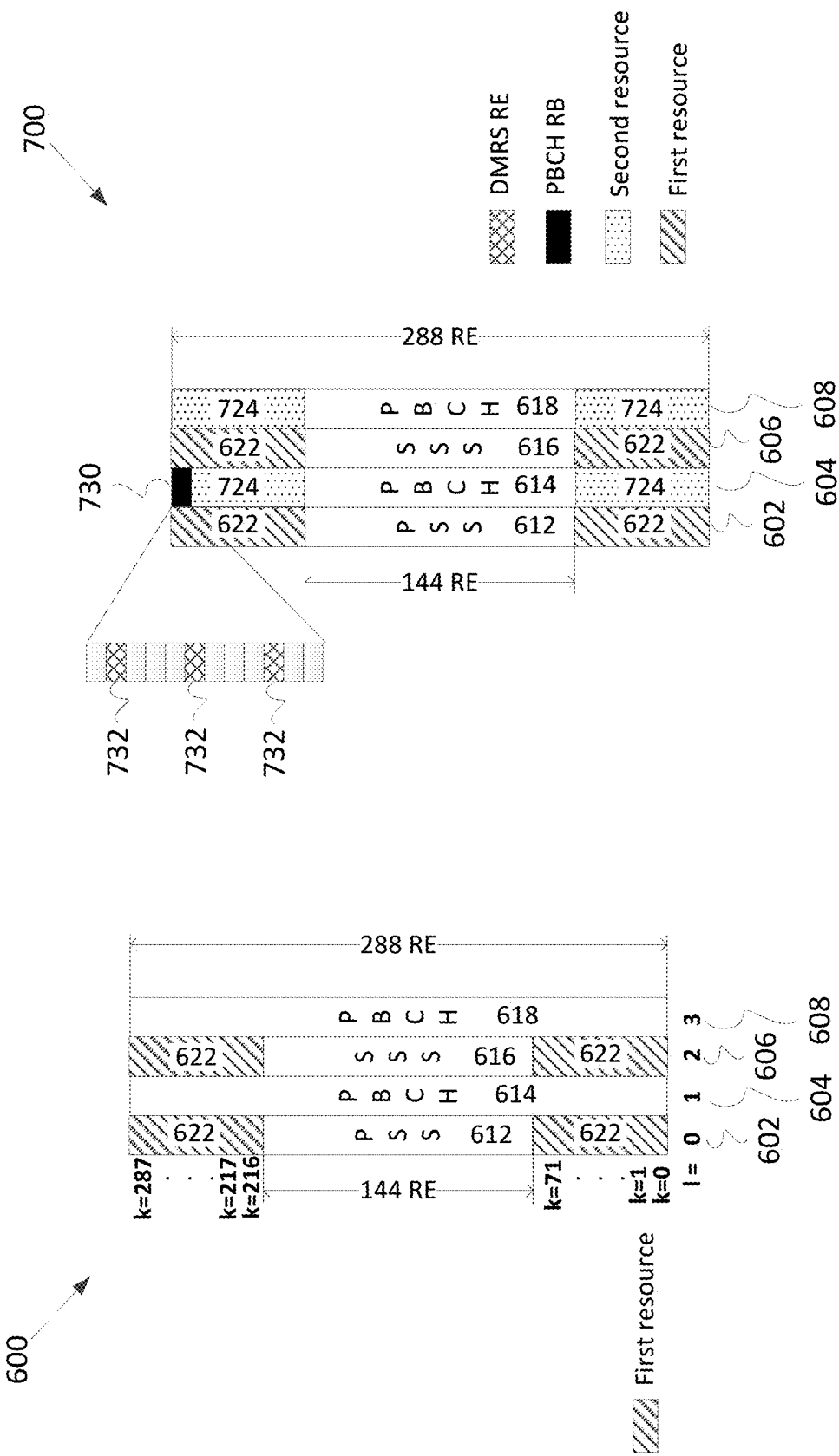

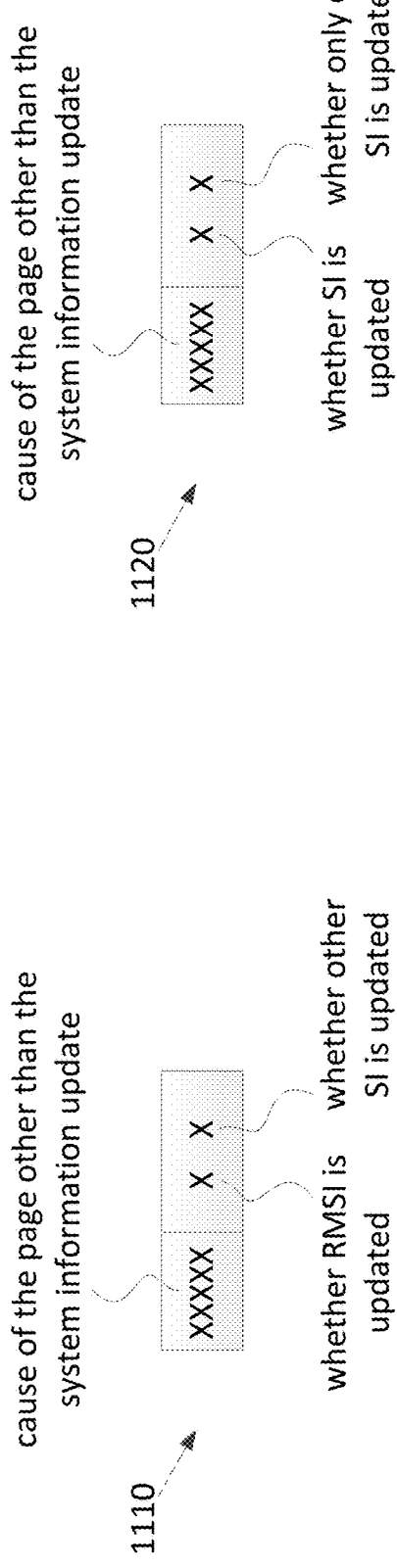
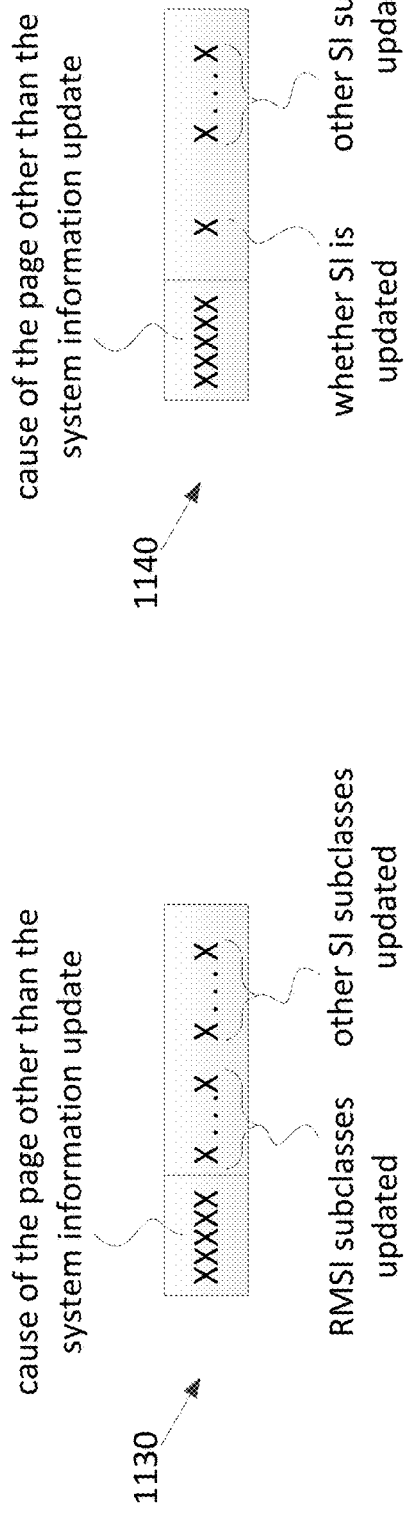
FIG. 11A
FIG. 11B
FIG. 11C
FIG. 11D

COMMUNICATING PAGING INFORMATION IN WIRELESS COMMUNICATIONS

CROSS REFERENCE TO RELATED APPLICATIONS

This patent document is a continuation of and claims benefit of priority to International Patent Application No. PCT/CN2017/097179, filed on Aug. 11, 2017. The entire content of the before-mentioned patent application is incorporated by reference as part of the disclosure of this application.

TECHNICAL FIELD

This application relates to systems, devices, and techniques for wireless communications.

BACKGROUND

A wireless communication network of base stations provides wireless communications to mobile stations or other wireless devices, which are generally referred to as user equipment, by using downlink communications channels to send information to the user equipment and uplink communications to receive information from the user equipment. The wireless network and the user equipment are designed to allow the user equipment to be in a power saving mode (e.g., an idle mode) to reduce the user equipment activities for saving power. The base stations (or the base station controllers) can send paging messages to user equipment to wake up the user equipment from the power saving mode.

SUMMARY

This document describes technologies, among others, for communicating and using timing information related to paging user equipment in a wireless communications network.

According to some embodiments, a method for paging user equipment in a wireless network is provided. The method includes mapping a paging indication to one or more resource elements. The one or more resource elements are resource elements in one or more synchronization signal symbols that are not mapped by the synchronization signal. The method includes transmitting the paging indication to trigger a response from a user equipment for performing subsequent paging.

According to some embodiments, the method includes the one or more resource elements including one or more continuous pluralities of resource elements without a demodulation reference signal mapped to a resource element of the continuous plurality of resource elements.

According to some embodiments, the method includes mapping a demodulation reference signal to one or more resource elements in one or more physical broadcast channel symbols that are adjacent to at least one of the one or more synchronization signal symbols. The demodulation reference signal provides a reference signal for demodulating the paging indication. The paging indication shares a same antenna port with the one or more physical broadcast channel symbols.

According to some embodiments, the method includes the one or more resource elements being outside a bandwidth of the one or more synchronization signals. The one or more resource elements are inside a bandwidth of one or more physical broadcast channels.

According to some embodiments, the method includes transmitting a demodulation reference signal in a second one or more resource elements. The second one or more resource elements are in one or more physical broadcast channel symbols. The second one or more resource elements are outside the bandwidth of the one or more synchronization signals. The second one or more resource elements are inside the bandwidth of the one or more physical broadcast channel. The demodulation reference signal provides a reference signal for demodulating the paging indication.

According to some embodiments, the method includes the paging indication including an indicator of a paging transmission mode. The paging transmission mode is a mode by which a paging message is to be transmitted.

According to some embodiments, the method includes selecting the paging transmission mode from among a plurality of available transmission modes.

According to some embodiments, the method includes mapping a paging reason category indication information to the one or more resource elements.

According to some embodiments, the method includes receiving one or more responses to the paging indication from one or more user equipment. The method further includes transmitting one or more paging messages based on information received in the one or more responses.

According to some embodiments, the method includes transmitting the paging indication using a plurality of antenna ports. The method further includes receiving one or more responses to the paging indication from one or more user equipment. Each response indicates at least one antenna port. The method further includes transmitting one or more paging messages using the antenna ports indicated in the responses. The one or more paging messages are not transmitted using other antenna port not indicated in the responses.

According to some embodiments, the method includes determining a group of user equipment to which one or more user equipment to page belong. The paging indication includes an indicator for the group of user equipment.

According to some embodiments, a method is provided for responding to paging by a user equipment in a wireless network. The method includes receiving a paging indication in one or more resource elements. The one or more resource elements are resource elements in one or more synchronization signal symbols that are not mapped by the synchronization signal. The paging indication triggers a response from the user equipment to perform subsequent paging.

According to some embodiments, the method includes the one or more resource elements including one or more continuous pluralities of resource elements without a demodulation reference signal mapped to a resource element of the continuous plurality of resource elements.

According to some embodiments, the method includes receiving a demodulation reference signal in one or more resource elements in one or more physical broadcast channel symbols that are adjacent to at least one of the one or more synchronization signal symbols. The demodulation reference signal provides a reference signal for demodulating the paging indication. The paging indication shares a same antenna port with the one or more physical broadcast channels.

According to some embodiments, the method includes the one or more resource elements being outside a bandwidth of the one or more synchronization signals, and wherein the one or more resource elements are inside a bandwidth of one or more physical broadcast channels.

According to some embodiments, the method includes receiving a demodulation reference signal in a second one or more resource elements. The second one or more resource elements are in one or more broadcast channel signal symbols. The second one or more resource elements are outside the bandwidth of the one or more synchronization signals. The second one or more resource elements are inside the bandwidth of the one or more broadcast channel signals. The demodulation reference signal provides a reference signal for demodulating the paging indication.

According to some embodiments, the method includes the paging indication including an indicator of a paging transmission mode. The paging transmission mode is a mode by which a paging message is to be transmitted.

According to some embodiments, the method includes the paging transmission mode being selected from among a plurality of available transmission modes.

According to some embodiments, the method includes mapping a paging reason category indication information to the one or more resource elements.

According to some embodiments, the method includes transmitting a response to the paging indication. The method further includes receiving one or more paging messages that are transmitted based on information transmitted in the response and zero or more other responses.

According to some embodiments, the method includes receiving the paging indication in a space corresponding to one antenna port of a plurality of antenna ports over which the paging indication was transmitted. The method further includes transmitting a response to the paging indication. The response and zero or more other responses from other user equipment indicate at least one antenna port. The method further includes receiving one or more paging messages in a space corresponding to one of the at least one indicated antenna ports. The one or more paging messages are transmitted using the antenna ports indicated in the responses.

According to some embodiments, the method includes receiving the paging indication. The paging indication includes an indicator for a group of user equipment determined based on incoming data information indicating a user equipment to page. The paging indication does not include an indicator for at least one other group of user equipment.

BRIEF DESCRIPTION OF THE DRAWINGS

FIG. 6 is a diagram showing resource element allocation to synchronization and broadcast channels.

FIG. 7 is a diagram showing resource element allocation to synchronization and broadcast channels.

FIG. 11A is a diagram of a data structure for transmitting paging reason category indication information.

FIG. 11B is a diagram of a data structure for transmitting paging reason category indication information.

FIG. 11C is a diagram of a data structure for transmitting paging reason category indication information.

FIG. 11D is a diagram of a data structure for transmitting paging reason category indication information.

Like reference symbols in the various drawings indicate like elements.

DETAILED DESCRIPTION

Due to continuous progress in radio technology, a wide range of wireless applications have emerged and continue to emerge, which has led to a growth in wireless deployments. However, traditional technologies are falling short of meeting such an increased demand, at least because the spectrum resource of approximately 300 MHz to 3 GHz is proving insufficient to meet the ever-increasing bandwidth demands based on current technologies. Thus techniques are needed to improve the efficiency with which bandwidth is used to support wireless applications. The disclosed techniques for paging can be used for efficient bandwidth utilization in wireless communications, e.g., improving resource utilization in connection with use of multiple antennas for transmission and/or reception by sending a paging indication from a base station to the user equipment prior to paging the user equipment of various users served by the base station.

Figure 1:
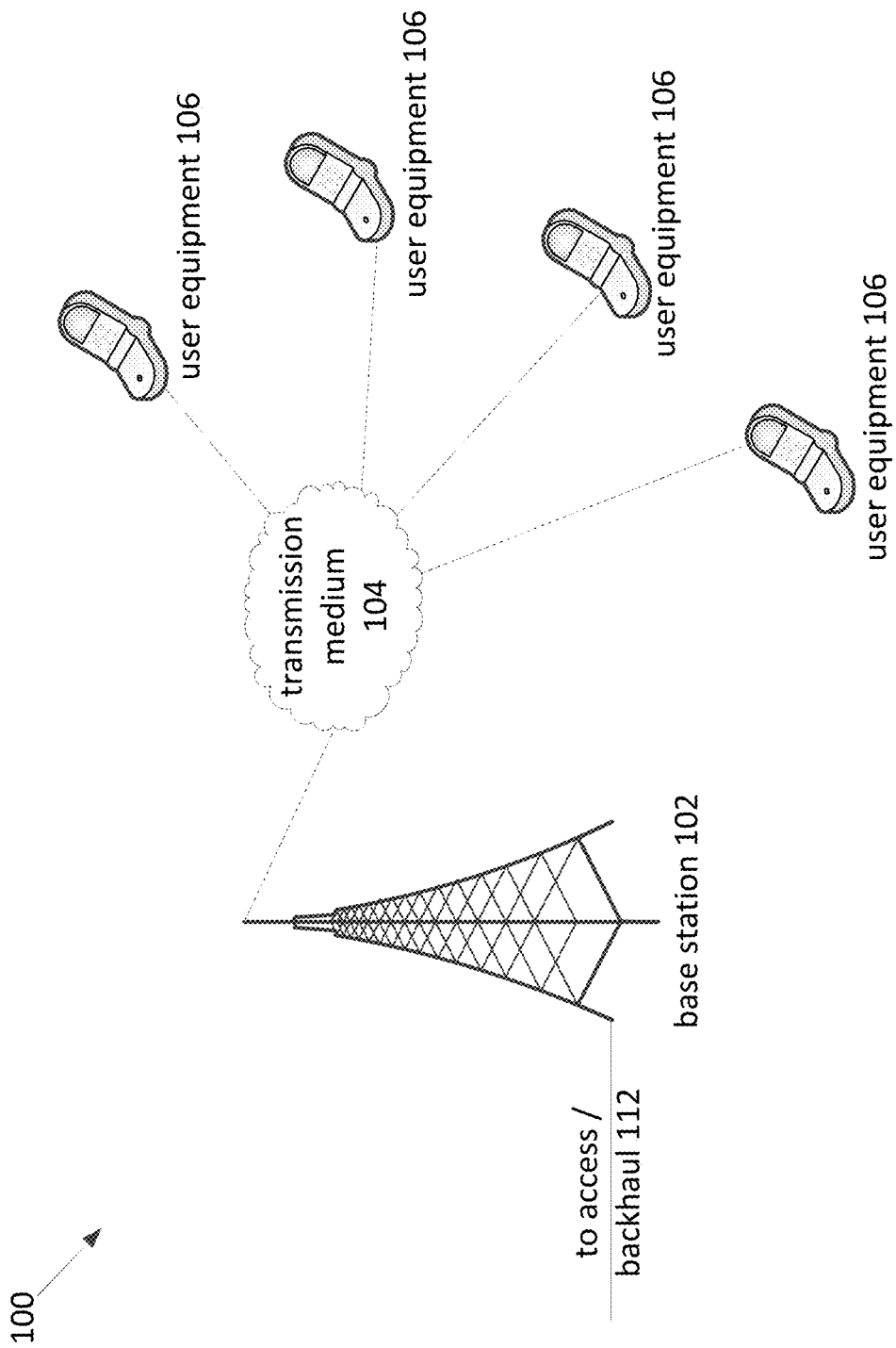
FIG. 1 is a diagram showing an example wireless communications system.

FIG. 1 is a diagram showing an example wireless communications system 100. The system 100 includes a base station 102 and multiple user equipment 106 being able to communicate with each other over a transmission medium 104. The transmissions from the base station 102 to the user equipment 106 are generally called downlink or downstream transmissions. The transmissions from the user equipment 106 to the base station 102 are generally called uplink or upstream transmissions. The transmission medium 104 is typically a wireless (air) medium. The base station 102 may also be communicatively coupled with other base stations or other equipment in the network via a backhaul or an access network connection 112.

Figure 2:
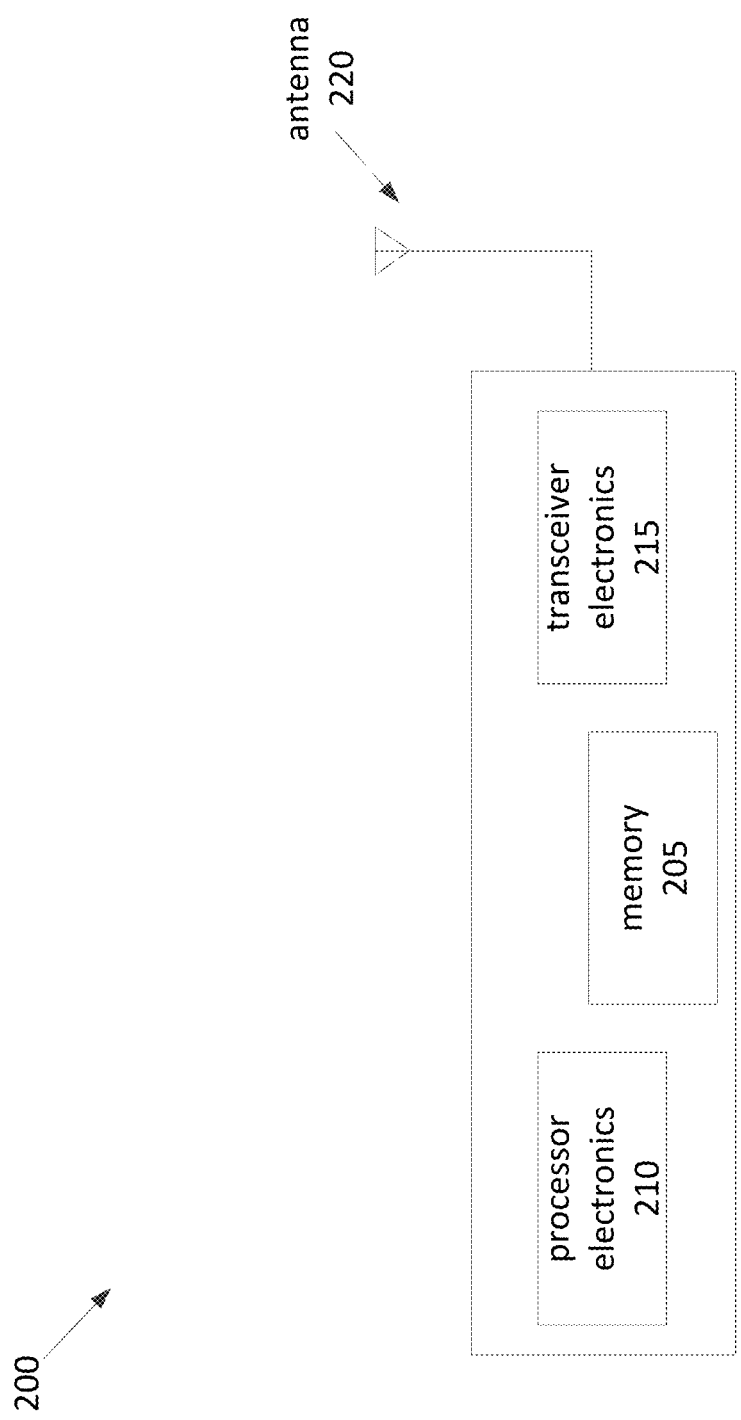
FIG. 2 is a block diagram showing an example of a wireless communication apparatus 200.

FIG. 2 is a block diagram showing an example of a wireless communication apparatus 200. The wireless communication apparatus 200 may be provided as a user equipment (e.g., user equipment 106), as a base station (e.g., base station 102), or otherwise. The apparatus 200 includes a processor 210 that may be configured to implement one of the techniques described herein, transceiver electronics 215 that is able to transmit signals or receive signals using the antenna(s) 220, and one or more memories 205 that may be used to store instructions executable by the processor 210 and/or data storage.

One way that the problem of insufficient bandwidth may be addressed is to use a different bandwidth than has traditionally been used for wireless applications. For instance wireless communications could use a carrier frequency in the range of 28 GHz, 45 GHz, 70 GHz, etc., each of which is considerably higher than the carrier frequencies used by the existing fourth generation (4G) communications systems.

This higher carrier frequency introduces some challenges, such as a larger transmission path loss, the signal is easily absorbed by oxygen, the signal is easily affected by rain attenuation, etc., each of which seriously affects performance of such a high frequency communications system.

However, higher carrier frequency also introduces benefits. For instance, because the higher frequency has a shorter wavelength, it is possible to use shorter antennas, thus allowing the use of more antenna elements per unit of area. With more antenna elements, beamforming can be used to improve antenna gain, which can be used to offset the performance losses of the high frequency signal.

With beamforming, a transmitter is able to concentrate the emission of energy in a particular direction, while in other directions the energy is small or absent. This means that each beam has a directivity, that is, it covers a certain direction or physical space and the user equipment (e.g., user equipment 106) that are present therein. It is foreseeable that a base station (e.g., base station 102) could employ dozens or even hundreds of antennas, thus supporting transmission to dozens or hundreds of spatially-independent (or at least partially independent) directions within the same cell.

Figure 3:
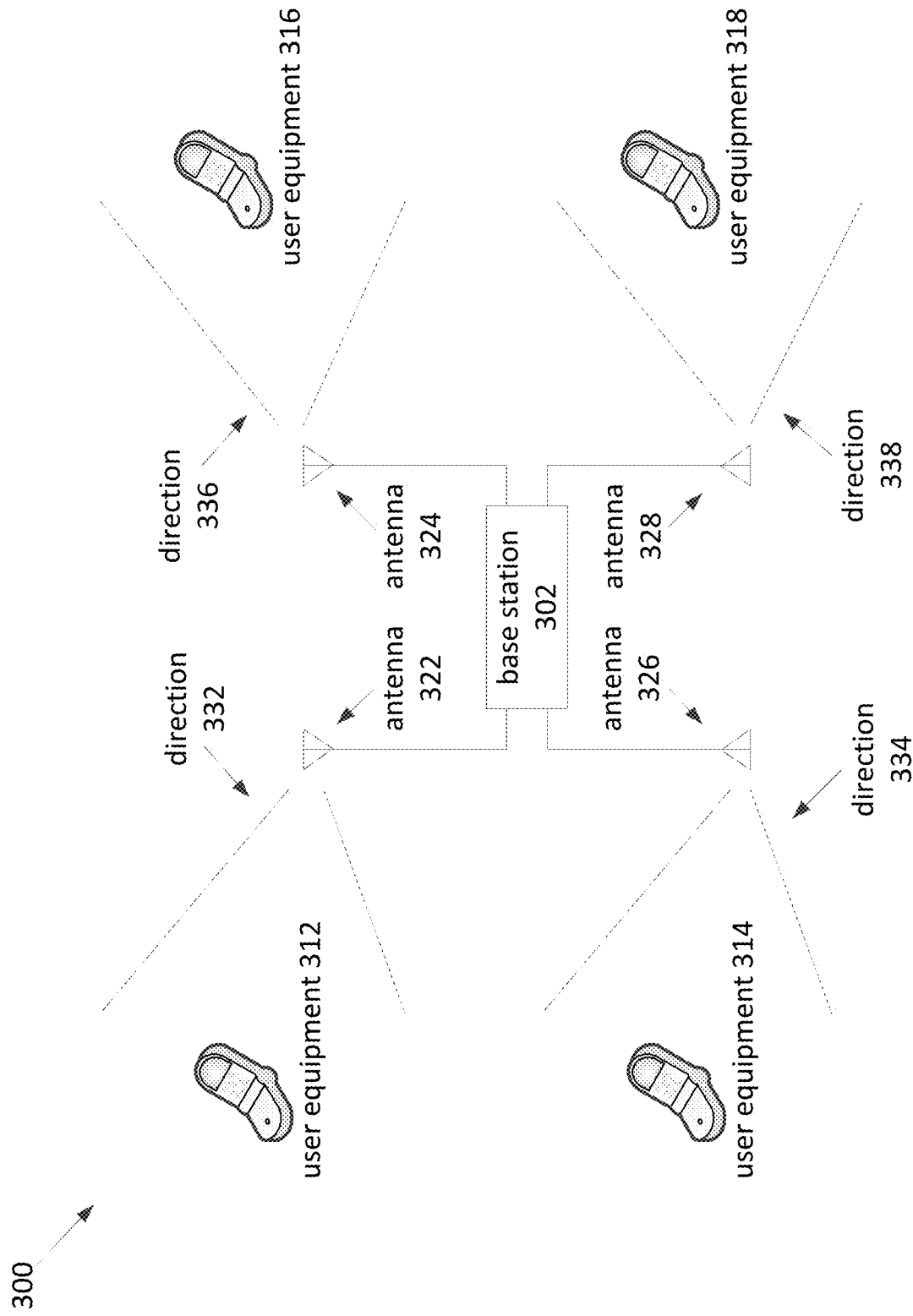
FIG. 3 is a diagram showing an example wireless communications system that employs beamforming.

FIG. 3 is a diagram showing an example wireless communications system 300 the employs beamforming. The system 300 may be provided as previously described (e.g., wireless communication system 100). Further, the system 300 includes a base station 302 in communication with user equipment 312, user equipment 314, user equipment 316, and user equipment 318. The base station 302 may be provided as previously described (e.g., base station 102, wireless transmission apparatus 200). The user equipment 312, 314, 316, 318 may each be provided as previously described (e.g., user equipment 106, wireless transmission apparatus 200).

The base station 302 includes antenna 322, antenna 324, antenna 326, and antenna 328. The antennas 322, 324, 326, and 328 may be provided as previously described (e.g., antenna 220). The base station 302 and the antennas 322, 324, 326, 328 employ beamforming into direction 332, direction 334, direction 336, and direction 338. In particular, one or more antennas of 322, 324, 326, and 328 employ beamforming with specific weights in order to emit energy in the direction 332 (illustrated by hashed lines) but emits little or no energy outside of the direction 332. Because the user equipment 312 is within the direction 332, a signal transmitted by the base station 302 in the direction 332 would be received by the user equipment 332. But, because the user equipment 312 is not within the direction 334, the direction 336, or the direction 338, a signal transmitted by the base station 302 in any of the directions 334, 336, 338 would not be received by the user equipment 312.

Each of directions 332, 334, 336, 338 may alternatively be referred to as antenna ports, which may be a logical identifier that the base station 302 associates with a given antenna port/direction. In other embodiments, antenna ports may correspond to a mapping of weights to be applied to one or more of the antennas 322, 324, 326, 328. For example, an additional antenna port may be defined based on partial emission by the antennas 322, 324 and no emission by the antennas 326, 328. Thus an antennas port may correspond to a single one of the antennas 322, 324, 326, 328 or to combinations of the antennas 322, 324, 326, 328 with accompanying weights.

It should be understood that the illustration of FIG. 3 is only exemplary. In some embodiments, the directions 332, 334, 336, 338 may be defined in three dimensions (rather than the two dimensions shown). Additionally, the base station 302 may employ tens, hundreds, or more antennas (rather than the four antennas shown). Additionally, the base station may transmit signals in tens, hundreds, or more directions (rather than the four directions shown). Additionally, the directions 332, 334, 336, 338 may partially or wholly overlap (rather than being wholly spatially distinct as shown). Additionally, the base station 302 may communication with tens, hundreds, or more user equipment (rather than the four user equipment shown).

Beamforming presents a benefit of allowing a base station to transmit a message in only one direction, while leaving the bandwidth in other directions unused or available for other messaging. For example, if the base station 302 has a message to transmit to the user equipment 312, then the base station can use transmit that message in only the direction 332 while leaving the bandwidth in the directions 334, 336, 338 available for messaging to the user equipment 314, 316, 318 present in those respective directions. While there are some limitations to this benefit due to interference and other concerns, beamforming essentially allows a base station and the wireless communications system of which it is a part to multiple the messaging capacity many times without increasing the spectrum used.

But this solution also present a new challenge. In particular, in order to realize the benefit just described, the base station 302 must know that the user equipment 312 is present in the direction 332, as opposed to being present in one of the directions 334, 336, 338. But the base station 302 may not always have this information, as describe further below.

In particular, the user equipment 312 may enter a power saving mode such as an idle state after having initially communicated with the base station 302. A discontinuous reception mode (DRX) can be implemented in the idle state in the paging state of the user equipment. The user equipment 312 may enter the idle state when it does not have any information to transmit to the base station 302. The user equipment 312 may enter the idle state in order to reduce the draw on a battery providing electrical charge to the user equipment 312. But while the user equipment 312 is in the idle state, the base station 302 may receive information from the network that needs to be transmitted to the user equipment 312 (e.g., there is an incoming call for the user equipment 312, downlink data arriving indication, system message change, receiving emergency warning (EWTS), receiving mobile alert (CMAS)). In order to alert the user equipment 312 of this incoming data, the base station 302 may use a paging mechanism.

With the paging mechanism, the user equipment 312 may "wake up" according to a predetermined schedule and check a downlink paging channel for any paging message. If the user equipment 312 detects a paging message during one of these observations of the paging channel, then the user equipment 312 is alerted to the presence of incoming data for the user equipment 312 at the base station 302, and proceeds accordingly. As such, when the base station 302 receives information from the network that needs to be transmitted to the user equipment 312, the base station 302 transmits a paging message on the paging channel according to the predetermined schedule of the user equipment 312. The base station 302 generally knows this predetermined schedule (e.g., the user equipment 332 notifies the base station 302 of its paging schedule prior to entering idle mode).

In the existing LTE systems, when a base station has paging information to transmit to a user equipment, the base station notifies all user equipment within the base station's cell that a paging message is being transmitted. The base station sends this notification by scrambling a signal in the physical downlink control channel (PDCCH) with a special fixed value called the paging radio network temporary identifier (P-RNTI). This alerts all user equipment in the cell (that were awake to monitor the PDCCH at that time) that a paging message is included in the same subframe transmission, specifically, in the paging control channel (PCCH), which is a logical channel mapped to the paging channel (PCH), which is a transport channel mapped to the physical downlink shared channel (PDSCH).

Thus, the base station 302 generally knows when to transmit a paging message for the user equipment 312. But with beamforming, the base station 302 does not necessarily know where to transmit the paging message for the user equipment 312. This is because the user equipment 312 may move around inside the cell serviced by the base station 302. As a result, the user equipment 312 may be present at the time of paging in a different direction (e.g., the direction 332) than the direction that the user equipment 312 was in at the time of entering the idle state (e.g., the direction 334).

In fact, there is a further complication to the problem. Theoretically, the base station 302 could transmit the paging message to all of the directions 332, 334, 336, 338 at the same time (i.e., at the time the user equipment 312 is awake and monitoring the paging channel), even though this would undo some of the bandwidth-savings benefit described previously. This may be referred to as a sweeping or beam sweeping technique. However, practical limitations in the transceiver hardware for the base station 302 generally make it impossible to transmit on so many antennas at the same time. Thus, the base station 302 would have to stagger transmission of the paging message to the directions 332, 334, 336, 338. This then complicates the ability of the base station 302 to transmit the paging message while the user equipment 312 is monitoring the paging channel (i.e., the base station 302 may not transmit the paging message while the user equipment 312 is monitoring the paging channel, depending on which of the directions 332, 334, 336, 338 the user equipment 312 is located). Thus while application of a beam sweeping technique is possible using existing systems, it is not efficient. This is described in further detail below.

In a beam-based transmission system, the beam direction of different subframes/timeslots is based on the flexible configuration of the service. According to the paging mechanism existing system (e.g., LTE), it is necessary to load the paging message within the transmission subframe/slot corresponding to each beam, which means that the user equipment paging message reception for different beams will be distributed to multiple subframes/slots within the paging cycle. Unlike with such existing systems, the paging control information (DCI) and the paging message are not necessarily transmitted in the same subframe. Thus, the structure of the above-mentioned beam scan is introduced to poll transmitting in each beam direction. Such beam scan transmission structure means higher reception complexity and energy overhead for the user equipment, it also means greater downlink resource overhead for the base station and the network. Therefore, efficient transmission of paging-related control information is required in order to avoid unnecessary paging transmission and reception. In particular, what is needed is a technique to trigger a user equipment to begin a paging process, with the technique being both efficient in terms of user equipment energy consumption (i.e., idle time versus wake time) and efficient in terms of use of spectrum resources for the cell (i.e., amount of bandwidth used).

Figure 4:
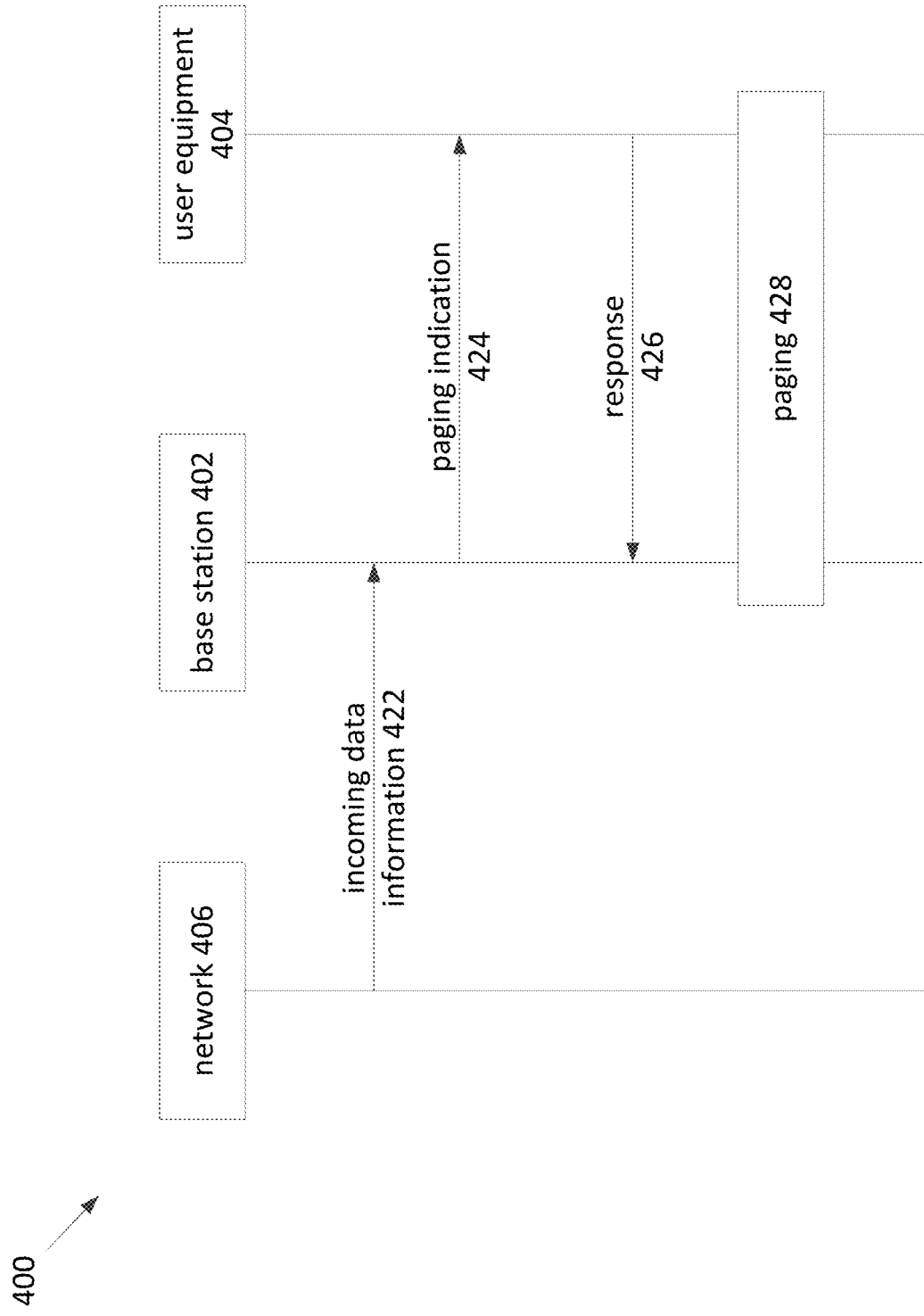
FIG. 4 is a sequence diagram showing a process for triggering paging activity.

FIG. 4 is a sequence diagram showing a process 400 for triggering paging activity. The process 400 involves a network 406, a base station 402 (e.g., as described for base station 102, 302, wireless communication apparatus 200), and a user equipment 404 (e.g., as described for user equipment 106, 312, wireless communication apparatus 200).

The network 406 transmits incoming data information 422 to the base station 402. The incoming data information 422 may include information identifying a particular user equipment (e.g., user equipment 404), a group of user equipment, or all user equipment for which incoming information is available.

In response to receiving the incoming data information 422, the base station 402 transmits a paging indication 424 to user equipment 404. The paging indication 424 may include an indicator as to which user equipment (e.g., a specific user equipment, a group of user equipment) should respond to the base station 402 in order to perform subsequent paging.

In response to receiving the paging indication 424, the user equipment 404 transmits a response 426 to the base station 402. The response 426 may include information relating to a manner in which the base station 402 can transmit a paging message to the user equipment 404. For example, the response 426 may include identification of a beamforming direction (e.g., identification of a direction, identification of an antenna, identification of an antenna port) where the user equipment 404 is presently located.

The base station 402 and the user equipment 404 performing paging 428 based on the exchange of the paging indication 424 and the response 426. For example, the paging 428 may include the user equipment monitoring a resource for a paging message in accordance with identification information in the paging indication 424. And, the base station 402 may transmit a paging message in accordance with identification information in the response 426 (e.g., transmitting the paging message to only the antenna port identified by the response 426).

Figure 5:
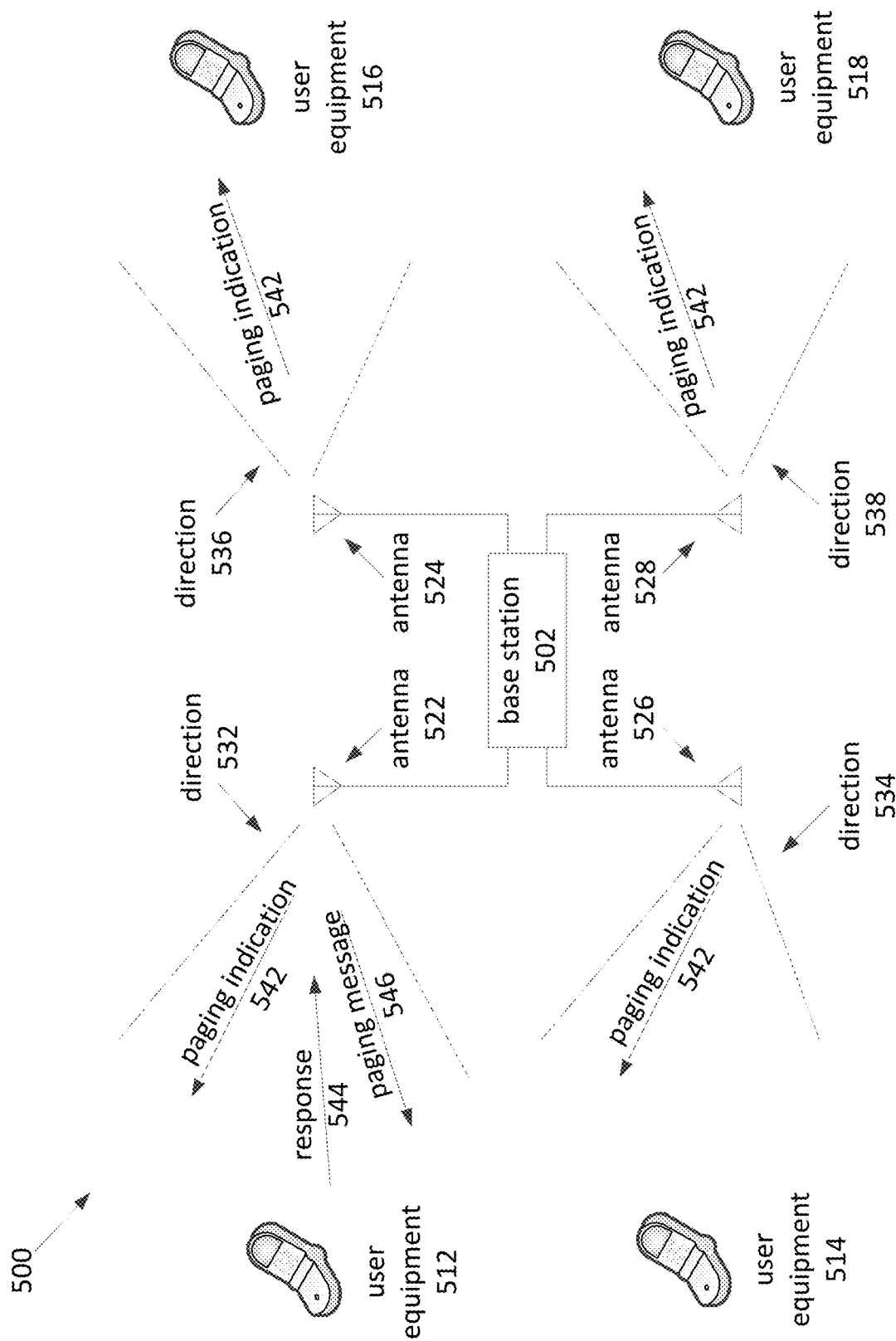
FIG. 5 is a diagram showing a wireless communications system that uses a process to trigger paging activity.

FIG. 5 is a diagram showing a wireless communications system 500 that uses a process to trigger paging activity. The system 500 includes base station 502 (e.g., as described for base station 102, 302, 402, wireless communication apparatus 200) and user equipment 512, 514, 516, 518 (e.g., as described for user equipment 106, 312, 404, wireless communication apparatus 200). The base station 502 includes antennas 522, 524, 526, 528 (e.g., as described for antennas 220, 322, 324, 326, 328). The base station 502 transmits signals using beamforming with the antennas 522, 524, 526, 528 in directions 532, 534, 536, 538, respectively.

The base station 502 may receive incoming data information (e.g., as described with respect to incoming data information 422). The incoming data information may identify the user equipment 512 as having incoming data from the network. If the user equipment 512 is in the idle state, then the base station 502 does not necessarily know in which direction of the directions 532, 534, 536, 538 the user equipment 512 is present.

The base station 502 may then transmit a paging indication 542 in all the directions 532, 534, 536, 538 (i.e., using all of the antenna ports). The paging indication 542 may indicate that the user equipment 512 should respond in order to perform subsequent paging. Alternatively the paging indication 542 may indicate that all members of a group of user equipment, of which the user equipment 512 is a member, should respond in order to perform subsequent paging.

As a result of receiving the paging indication 542, the user equipment 512 may send a response 544 to the base station 502. For example, the response 544 may indicate that the user equipment 512 is in the direction 532.

As a result of receiving the paging indication 542, the user equipment 514, 516, 518 may not respond to the base station 502. For example, the user equipment 514, 516, 518 may not be members of a group to which the paging indication 542 pertains.

As a result of receiving the response 544, the base station 502 may transmit a paging message 546 using the antenna port for the direction 532. The base station 502 may not transmit the paging message 546 to any of the directions 534, 536, 538 because the base station 502 did not receive any response from the user equipment 514, 516, 518 in those respective directions.

FIG. 6 is a diagram showing resource element allocation 600 for synchronization signals and physical broadcast channels. The allocation 600 includes symbol 602, symbol 604, symbol 606, and symbol 608. Each symbol is a collection of resource elements that are communicated by one or more transmission symbols (e.g., by one orthogonal frequency division multiplexing (OFDM) symbol).

Each symbol 602, 604, 606, 608 is denoted by a value l (the lowercase letter L), which may be enumerated 0, 1, 2, and 3. Each symbol 602, 604, 606, 608 includes 288 resource elements. Each resource element is denoted by a value k, which may be enumerated 0 to 287. A resource element in the allocation 600 can be identified by coordinates (k, l). For example, resource element (0, 0) is the bottom, left-most resource element, which happens to be in the symbol space for the symbol 602. A resource element is the smallest unit of information transmission in the allocation 600, and a resource element is essentially a narrow slice of frequency at a narrow slice of time.

The allocation 600 maps each of the symbols 602, 604, 606, 608 to a different channel, where a channel is a group of resource elements together for a predefined purpose. The allocation 600 maps the symbol 602 to a primary synchronization signal 612 (PSS), which may alternatively be referred to as a primary synchronization channel (PSCH). The allocation 600 maps the symbol 606 to a secondary synchronization signal 616 (SSS), which may alternatively be referred to as a secondary synchronization channel (SSCH). The allocation 600 maps the symbol 604 to a physical broadcast signal, which may alternatively be referred to as a physical broadcast channel 614 (PBCH). The allocation 600 additionally maps the symbol 608 to the physical broadcast channel 618 (PBCH).

The primary synchronization signal 612, secondary synchronization signal 616, and physical broadcast channel 614, 618 may be signals transmitted by a base station to all user equipment in the base station's cell, regardless of whether the user equipment has established a connection to the base station. In particular, the physical broadcast channel 614, 618 may carry information that identifies the timing information (e.g., SFN, SS block index, etc.) used for user equipment timing determination, identifies how to decode other downlink transmission (e.g. RMSI scheduling information carried by PDCCH) from the base station, etc. The physical broadcast channel 618 may repeat substantially the same information included in the physical broadcast channel 614. The primary synchronization signal 612 and secondary synchronization signal 616 may carry information that identify cell that pertains to the base station as well as timing information for other downlink transmissions from the base station.

As shown in FIG. 6, the physical broadcast channel 614, 618 may use all 288 resource elements of the symbols 604, 608 to which the physical broadcast channel 614, 618 is allocated. For example, all 288 resource elements may carry information pertaining to the physical broadcast channel 614, 618 (including system information and DMRS for PBCH). As another example, even if all 288 resource elements to do not carry information pertaining to the physical broadcast channel 614, 618, the physical broadcast channel 614, 618 may include information in substantially the full range of 288 resource elements, even if some resource elements in the range are not used.

On the other hand, the primary synchronization signal 612 and the secondary synchronization signal 616 may not use all 288 resource elements of the symbols 602, 606 to which the primary synchronization signal 612 and the secondary synchronization signal 616 are allocated, respectively. For example, the primary synchronization signal 612 may only map synchronization information to resource elements k=72 to 215 of symbol 602 (l=0). This may leave some resource elements of symbol 602 (e.g., for l=0, k=0 to 71 and k=216 to 287) that do not carry any information pertaining to the primary synchronization signal 612. These unused portions of the symbol 602 may thus be mapped to a first resource 622 (showed with hatching). The first resource 622 may further include portions of the symbol 606 which are not used by the secondary synchronization signal 616.

In some embodiments, the first resource can be served as a non-scheduled physical channel. In particular, the base station transmits information with fixed resource allocation, default modulation and coding scheme. Accordingly, no blind detection is needed for user equipment receiving such information. The first resource can also be defined as control resource set/search space for downlink control information transmission. In the case, the first resource can carry one or more downlink control information with different DCI format. The modulation and coding scheme of such downlink control information can also be changed. Accordingly, the UE will detect the target DCI with corresponding DCI format in the first resource. One or more following control information can share a same DCI format or define different DCI formats for each of them: paging downlink control information (paging DCI), paging reason category indication information, scheduling information of the remaining minimum system information, user equipment indication information, and paging transmission mode indication information.

In some embodiments, the paging indication as described previously (e.g., paging indication 424, 542) may be mapped to the first resource 622. In addition, the paging indication may be carried on the first resource 622 that uses the same antenna port as the physical broadcast channel 614, 618. That is, the information contained in the paging indication (e.g., identifying a user equipment or a group of user equipment that should respond to the paging indication) may be transmitted using the resource elements of the first resource 622. This mapping may be beneficial for various reasons. For example, the first resource 622 may otherwise not be put to use by the allocation 600 and the base station that transmits according to the allocation 600. As another example, the symbols 602, 604, 606, 608 containing the primary synchronization signal 612, the secondary synchronization signal 616, and the physical broadcast channel 614, 618 may be symbols that are transmitted frequently and on all antenna ports (e.g., due to the importance of the information in those symbols for decoding other downlink transmissions). As such, the first resource 622 may be an advantageous group of resource elements in which to transmit the paging indication as being an efficient use of existing resources that are already being transmitted to all antenna ports.

As used herein, mapping may refer to any of a variety of activities related to providing specific information in a specific one or more resource elements. For example, mapping may include transmitting specific information in a specific one or more resource elements. As another example, mapping may including reserving a specific one or more resource elements for specific information. As another example, mapping may including allocating a specific one or more resource elements to specific information. As another example, mapping may include storing specific information in a buffer or other memory in order to transmit the specific information in a specific one or more resource elements.

In some embodiments, the first resource may be described in other ways. For example, it can be observed that the enumeration of resource elements k=0 to 287 is an enumeration in the frequency domain. Thus, because the primary synchronization signal 612 and secondary synchronization signal 616 occupy a smaller range of resource elements than does the physical broadcast channel 614, 618, it can be observed that the primary synchronization signal 612 and secondary synchronization signal 616 occupy a narrower bandwidth than does the physical broadcast channel 614, 618. Thus the first resource 622 may be described as being in a symbol 602, 606 allocated to the primary synchronization signal 612 and/or secondary synchronization signal 616, but outside the bandwidth of the primary synchronization signal 612 and/or secondary synchronization signal 616, and inside the bandwidth of the physical broadcast channel 614, 618.

FIG. 7 is a diagram showing resource element allocation 700 to synchronization and broadcast channels. The allocation 700 may be provided substantially as described with respect to the allocation 600, with like reference numerals denoting like items.

The allocation 700 shows further detail on how the resource elements of the symbols 604 and 608 may be mapped by the physical broadcast channel 614, 618. In particular, the physical broadcast channel 614, 618 may use the resource elements in the ranges k=0 to 71 and k=216 to 287 in a way that is different from the use of the resource elements in the range k=72 to k=215. These outside ranges may be referred to collectively as a second resource 724. In addition, the paging indication carried by the first resource 622 that uses the same antenna port as the physical broadcast channel 614, 618. As such, demodulation reference signals of the second resource 724 can be used for demodulating the paging indication transmitted in the first resource 622.

The second resource 724 may include a physical broadcast channel resource block 730. In this context, a resource block refers to a continuous resource element (e.g., 12 continuous resource elements). The resource block 730 may include a mixture of demodulation reference signals 732 and PBCH resource elements. The demodulation reference signals 732 may be signals that the user equipment uses to determine how to demodulate the remainder of the resource elements in the symbols in which they occur (i.e., the symbols 604, 608). As shown, the resource block 730 and the second resource 724 may contain a 1 to 4 ratio of demodulation reference signals 732 to all of the resource elements.

In some embodiments, the first resource 622 may be mapped to a paging indication without also mapping a demodulation reference signal to the first resource 622. This may allow one or more continuous resources of one or more resource elements in the first resource 622 to be used to transmit the paging indication. Here a continuous resource may refer to an uninterrupted range of resource elements (e.g., k=216 to 287 in the symbol 602). This may be beneficial as allowing a simpler mapping and transmission scheme for the paging indication. This may also be beneficial for improving the efficiency of resource element usage.

At the same time, it may be necessary to have a demodulation reference signal in order for the user equipment to demodulate the paging indication transmitted in the first resource 622. As such, a demodulation reference signal 732 may be mapped to the second resource 724. And, the user equipment may use the demodulation reference signal 732 form the second resource 724 in order to demodulate the paging indication transmitted in the first resource 622.

It may be advantageous to provide the demodulation reference signal 732 in a the second resource 724 of a symbol that is adjacent to the symbol in which the first resource 622 is located carrying the paging indication. Here adjacency refers to adjacency of symbols (e.g., the symbols 604 is adjacent to the symbols 602 and 606 but not to the symbol 608). This approach may be advantageous as allowing the immediate demodulation of the paging indication, which in turn may lead to more efficient operation of the user equipment and subsequent paging process.

As with the first resource 622, the second resource 724 may be described in terms of its bandwidth location. For example, the second resource 724 may be described as being in a symbol 604, 608 allocated to the physical broadcast channel 614, outside the bandwidth of the primary synchronization signal 612 and/or secondary synchronization signal 616, and inside the bandwidth of the physical broadcast channel 614, 618. Notwithstanding the fact that FIG. 7 illustrates the second resource 724 as a separate block from the physical broadcast channel 614, 618, it should be understood that the second resource 724 may be considered a part of the physical broadcast channel 614, 618.

Figure 8:
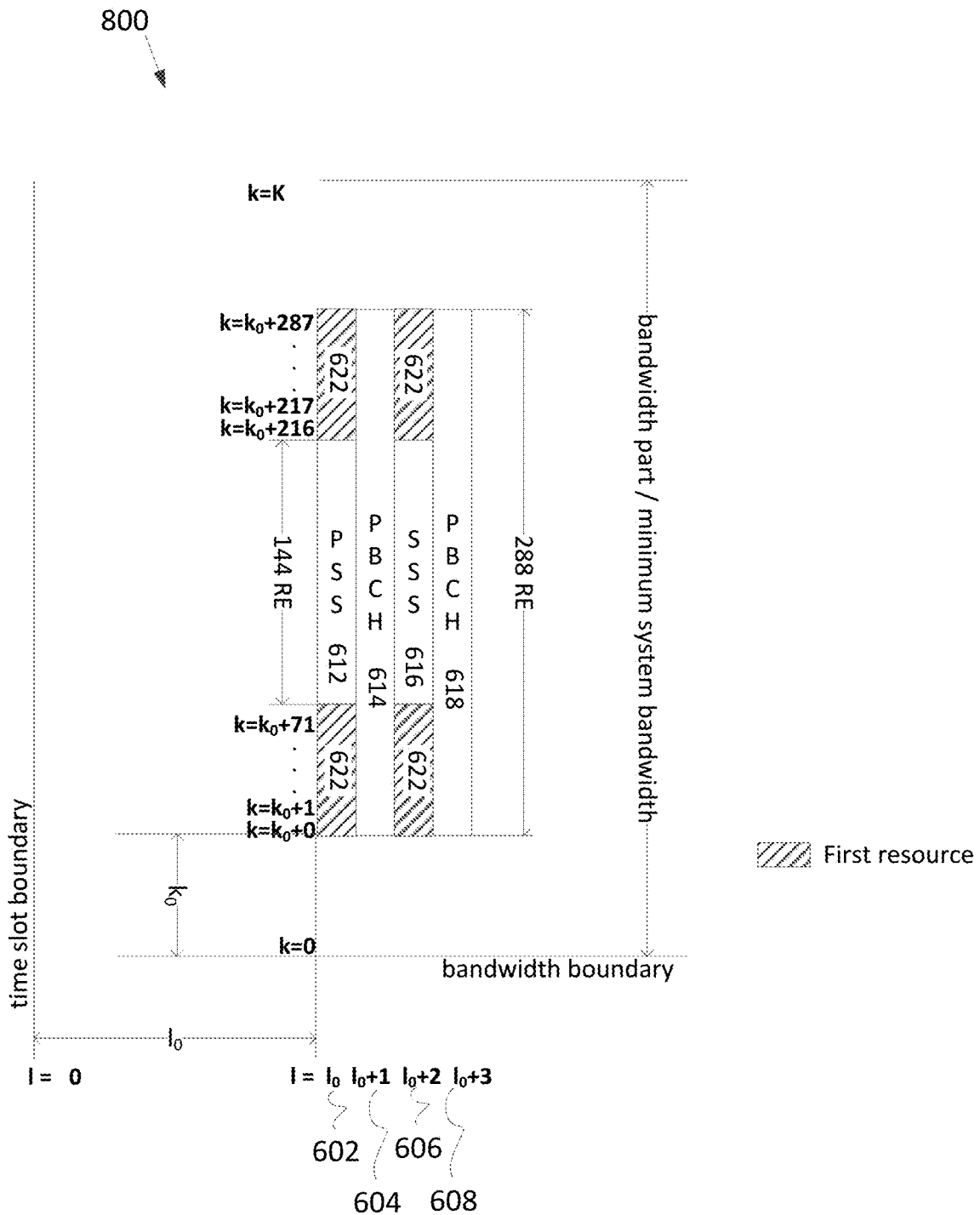
FIG. 8 is a diagram showing resource element allocation to synchronization and broadcast channels.

FIG. 8 is a diagram showing resource element allocation 800 to synchronization and broadcast channels. The allocation 800 may be provided substantially as described with respect to the allocations 600, 700, with like reference numerals denoting like items. However, the allocation 800 illustrates a situation where the enumerations of resource elements (using k and l) and symbols (using l) may be different than that described for the allocations 600, 700.

When the subcarriers are uniformly numbered within the bandwidth part (BWP) (or minimum system bandwidth) of the synchronization signal/physical broadcast channel block, $k_0$ may be introduced. In such instances, the first resource 622 includes resource element (k, l); where k represents the frequency domain index, that is, the subcarrier number within the bandwidth part, k ranges from $\{k_0, k_0+1, \ldots, k_0+71, k_0+216, k_0+217, \ldots, k_0+287\}$, where $k_0$ is the value of the subcarrier offset between the synchronization signal/physical broadcast channel block starting subcarrier and bandwidth part starting subcarrier. Here l represents the time domain index, that is, the symbol index in the slot, $l=\{l_0+0, l_0+2\}$, where $l_0$ is the value of the symbol offset between the synchronous signal/physical broadcast channel block starting symbol and the slot starting symbol.

As referred to herein, the minimum system bandwidth means the maximum system bandwidth supported by the system or user equipment with minimum capacity. All of the system components and user equipment can complete transmission and reception within minimum system bandwidth.

Figure 9:
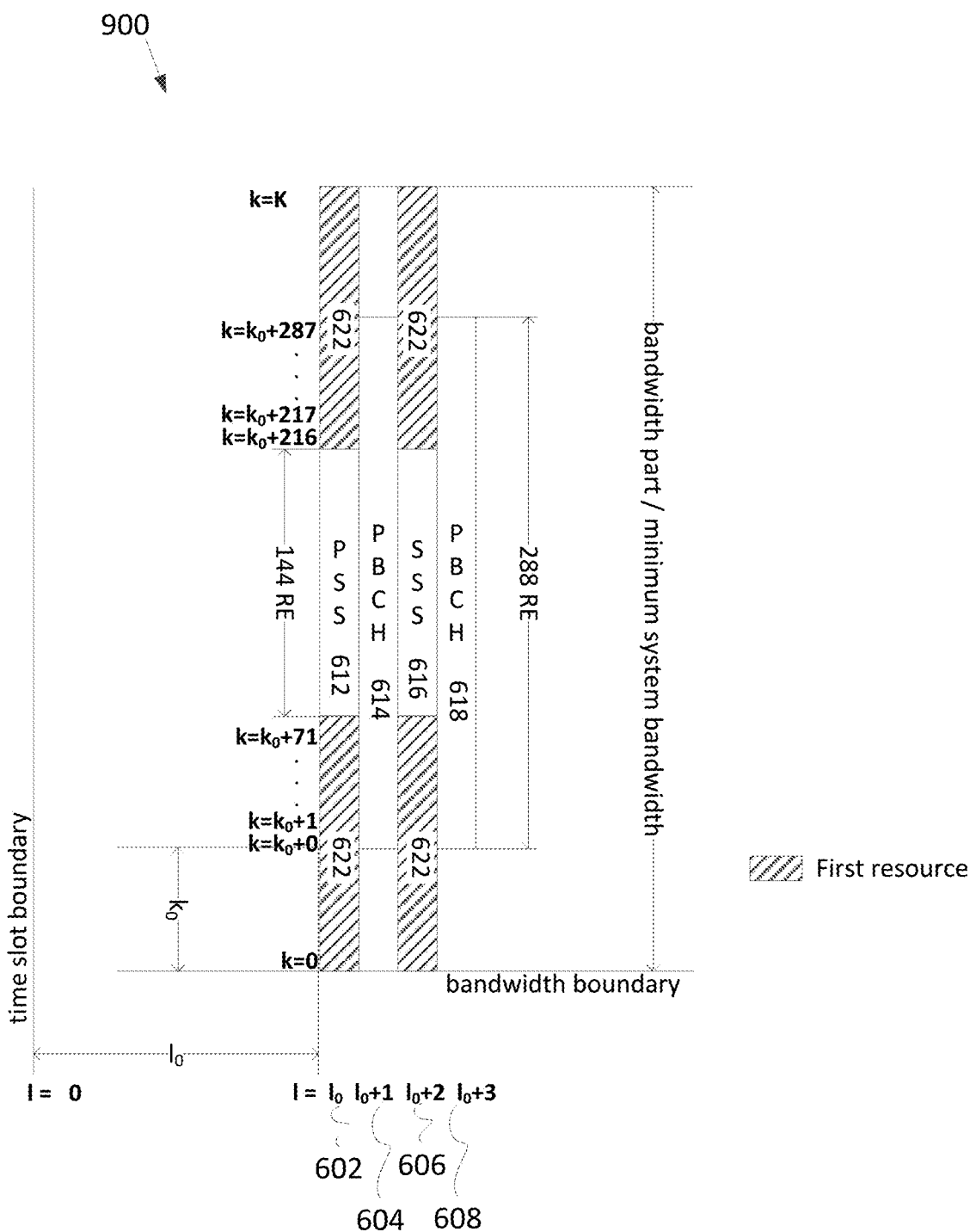
FIG. 9 is a diagram showing resource element allocation to synchronization and broadcast channels.

FIG. 9 is a diagram showing resource element allocation 900 to synchronization and broadcast channels. The allocation 900 may be provided substantially as described with respect to the allocations 600, 700, 800, with like reference numerals denoting like items. However, the allocation 900 illustrates a situation where the mapping of resource elements to the first resource 622 may be different than that described for the allocations 600, 700, 800.

In the time domain direction, the first resource 622 is mapped to the symbols 602, 606 where the primary synchronization signal 612 and the secondary synchronization signal 616 are located. In the frequency domain direction, the first resource 622 is mapped outside the bandwidth of the primary synchronization signal 612 and the secondary synchronization signal 616 but within the resource elements of the bandwidth part/the minimum system bandwidth. The first resource 622 includes the resource element (k, l); where k represents the frequency domain index, that is, the subcarrier number within the bandwidth part/the minimum system bandwidth, k ranges from $\{0, 1, \ldots, k_0+71, k_0+216, k_0+217, \ldots, K\}$, where $k_0$ is the value of subcarrier offset between the synchronization signal/physical broadcast channel block starting subcarrier and bandwidth part starting subcarrier, K represents the maximum subcarrier number of the bandwidth part/the minimum system bandwidth. Here l represents the time domain index, that is, the symbol index in the slot, $l=\{l_0+0, l_0+2\}$, where $l_0$ is the value of symbol offset between the synchronous signal/physical broadcast channel block starting symbol and the slot starting symbol.

In such embodiments, additional demodulation reference signals may be introduced for part of the first resource 622. In particular, additional demodulation reference signals may be included in the symbols for the primary synchronization signal 612 and the secondary synchronization signal 616 but outside the bandwidth of the physical broadcast channel 614, 618, such as with k ranges from $\{0, 1, \ldots, k_0-1, k_0+288, k_0+289, \ldots, K\}$ for both symbols $l=\{l_0+0, l_0+2\}$.

Figure 10:
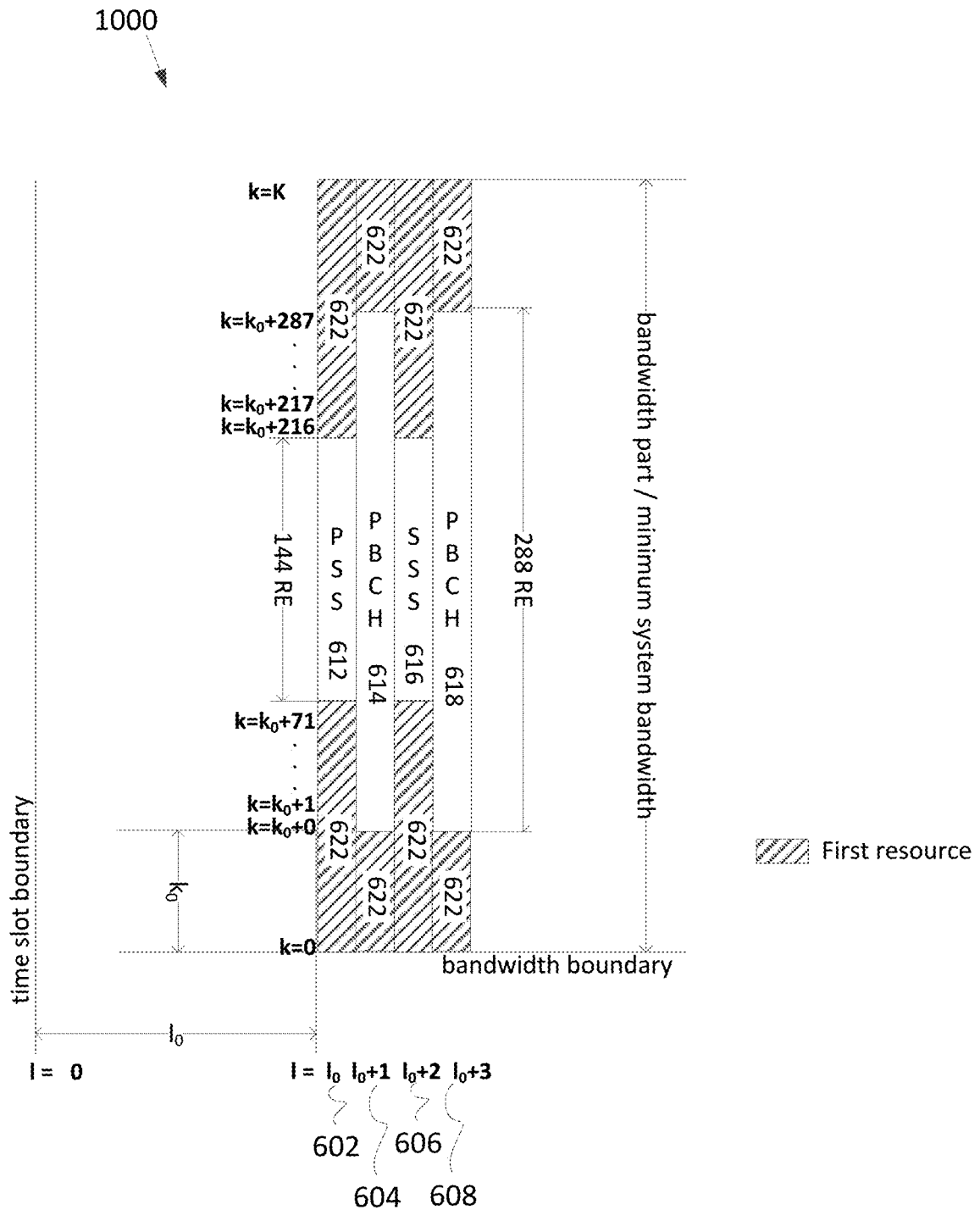
FIG. 10 is a diagram showing resource element allocation to synchronization and broadcast channels.

FIG. 10 is a diagram showing resource element allocation 1000 to synchronization and broadcast channels. The allocation 1000 may be provided substantially as described with respect to the allocations 600, 700, 800, 900, with like reference numerals denoting like items. However, the allocation 1000 illustrates a situation where the mapping of resource elements to the first resource 622 may be different than that described for the allocations 600, 700, 800, 900.

In the time domain, the first resource 622 is mapped to the symbols 602, 606 where the primary synchronization signal 612 and the secondary synchronization signal 616 are located. The first resource 622 is also mapped to the symbols 604, 608 where the physical broadcast channel 614, 618 are located. In the frequency domain direction, for symbols where the primary synchronization signal 612 and the secondary synchronization signal 616 are located, the first resource 622 is mapped outside the bandwidth of the primary synchronization signal 612 and the secondary synchronization signal 616 but within the resource elements of the bandwidth part/the minimum system bandwidth. The first resource 622 includes the resource element (k, l); where k represents the frequency domain index, that is, the subcarrier number within the bandwidth part/the minimum system bandwidth, k ranges from $\{0, 1, \ldots, k_0+71, k_0+216, k_0+217, \ldots, K\}$, where $k_0$ is the value of the subcarrier offset between the synchronization signal/physical broadcast channel block starting subcarrier and bandwidth part starting subcarrier, K represents the maximum subcarrier number of the bandwidth part/the minimum system bandwidth. Here l represents the time domain index, that is, the symbol index in the slot, $l=\{l_0+0, l_0+2\}$, where $l_0$ is the value of symbol offset between the synchronous signal/physical broadcast channel block starting symbol and the slot starting symbol.

For the symbols 604, 608 where the physical broadcast channel 614, 618 is located, the first resource 622 is mapped outside the bandwidth of the physical broadcast channel 614, 618 but within the resource elements of the bandwidth part/the minimum system bandwidth. The first resource 622 includes the resource element (k, l); where k represents the frequency domain index, that is, the subcarrier number within the bandwidth part/the minimum system bandwidth, k ranges from $\{0, 1, \ldots, k_0-1, k_0+288, k_0+289, \ldots, K\}$, where $k_0$ is the value of subcarrier offset between the synchronization signal/physical broadcast channel block starting subcarrier and bandwidth part starting subcarrier, K represents the maximum subcarrier number of the bandwidth part or the minimum system bandwidth. Here l represents the time domain index, that is, the symbol index in the slot, $l=\{l_0+1, l_0+3\}$, where $l_0$ is the value of symbol offset between the synchronous signal/physical broadcast channel block starting symbol and the slot starting symbol.

In such embodiments, additional demodulation reference signals may be introduced for part of the first resource 622. In particular, additional demodulation reference signals may be included in the symbols for the primary synchronization signal 612, the secondary synchronization signal 616, and the physical broadcast channel 614, 618, but outside the bandwidth of the physical broadcast channel 614, 618, k ranges from $\{0, 1, \ldots, k_0-1, k_0+288, k_0+289, \ldots, K\}$ for all of the symbols $l=\{l_0+0, l_0+1, l_0+2, l_0+3\}$.

In accordance with various embodiments described herein, the first resource can also carry various information. These include one or more of: paging downlink control information (paging DCI), paging reason category indication information, scheduling information of the remaining minimum system information, user equipment indication information and paging transmission mode indication information.

In various embodiments, there are two major categories reasons for paging. First, specific paging, and, second, public paging.

With specific paging, the base station is seeking to page a specific user equipment, such as when a user equipment is being called. In such situations, the base station may transmit paging downlink control information as part of the paging indication. The paging downlink control information may include scheduling information for a paging message, and the paging message may include identification information of the called user equipment (such as the user equipment's SAE temporary mobile subscriber identity, S-TMSI). Upon receiving the paging message, the user equipment determines that it is being paged and access the network to perform appropriate communications.

With public paging, the base station is seeking to page all user equipment within the base station's cell. Public paging may be broken down further into system message changing indication, early warning information (such as an earthquake and tsunami warning system (ETWS) notification), a commercial mobile alarm service (CMAS) notification, extended access barring (EAB) parameter changes, etc. Each of these is used to indicate that system information has changed, as opposed to a specific paging of a specific user equipment. The system change information can further include: remaining minimum system information and other system information, wherein the remaining minimum system information is the remaining system information of the minimum system information other than the main system information. The minimum system information is required system information during the initial access process of the user equipment. The main system information is system information carried on the physical broadcast channel. The other system information is system information of all system information other than the minimum system information.

In some embodiments, the first resource carries (e.g., as included in the paging indication) paging downlink control information. When the paging indication includes paging downlink control information, the system may transmit the paging indication in a sweeping mode, thereby transmitting the paging indication on all antenna ports and thus in all beam directions. Such embodiments may include both specific paging reasons and public paging reasons. In such situations, the paging indication including the paging downlink control information is mapped to the a first resource as described previously (e.g., the first resource 622).

The paging downlink control information can include scheduling information for the paging message. The scheduling information may indicate the transmission mode of the subsequent paging message, the resource allocation, and the like. In such situation, the paging message may also be sent in a sweeping mode on all antenna ports. The transmission resource of the paging message may be frequency-multiplexed with the synchronization signal/physical broadcast channel block in the same symbol, or another round of sweeping structure may be introduced.

In some embodiments, the first resource carries (e.g., as included in the paging indication) paging reason category indication information. The paging reason category indication information may be used to indicate a reason for which a paging indication is being transmitted. When the paging indication includes paging reason category indication information, the system may transmit the paging indication in a sweeping mode, thereby transmitting the paging indication on all antenna ports and thus in all beam directions.

For the public paging reason, the type of public paging may be indicated by a bitmap. Further consideration may be given to refine the system information update instructions, such as by classifying the update as RMSI (remaining minimum system information) update or other system information updates. The two updates may be further classified, divided into RMSI subclasses and other SI subclasses to specify which subclasses are updated.

FIGS. 11A, 11B, 11C, and 11D are diagram showing exemplary data structures 1110, 1120, 1130, and 1140, respectively, for transmitting paging reason category indication information. In some embodiments, one or more of the data structures 1110, 1120, 1130, 1140 may be transmitted as part of a paging indication.

The data structure 1110 includes the following: a system information update indication field, which contains one bit to indicate whether the RMSI is updated and one bit to indicate whether the other SI is updated. For example, a value of 0 can indicate no update, while a value of 1 can indicate that an update has occurred. The data structure 1110 may include additional bits to indicate a cause of the page for a reason other than the system information update (e.g., an early warning notification).

The data structure 1120 includes the following: a system information update indication field, which contains one bit to indicate whether the system information is updated and one bit to indicate whether only other SI is updated. For example, a value of 0 can indicate no update, while a value of 1 can indicate that an update has occurred. The data structure 1110 may include additional bits to indicate a cause of the page for a reason other than the system information update (e.g., an early warning notification).

The data structure 1130 includes the following: a system information update indication field, which contains N bits to indicate whether each of N subclasses of RMSI information is updated and M bits to indicate whether each of M subclasses of other SI information is updated. For example, a value of 0 can indicate no update, while a value of 1 can indicate that an update has occurred. In such embodiments, the RMSI and other SI information can be divided into subclasses as described above, and one bit of the system information update indication field can correspond to whether or not each subclass is updated. The data structure 1110 may include additional bits to indicate a cause of the page for a reason other than the system information update (e.g., an early warning notification).

The data structure 1140 includes the following: a system information update indication field, which contains one bit to indicate whether the system information is updated and M bits to indicate whether each of M subclasses of other SI information is updated. For example, a value of 0 can indicate no update, while a value of 1 can indicate that an update has occurred. In such embodiments, the other SI information can be divided into subclasses as described above, and one bit of the system information update indication field can correspond to whether or not each subclass is updated. The data structure 1110 may include additional bits to indicate a cause of the page for a reason other than the system information update (e.g., an early warning notification).

In some embodiments, the first resource carries (e.g., as included in the paging indication) scheduling information of the remaining minimum system information (RMSI DCI). When the paging indication includes scheduling information of the remaining minimum system information, the system may transmit the paging indication in a sweeping mode, thereby transmitting the paging indication on all antenna ports and thus in all beam directions. Such embodiments may include both specific paging reasons and public paging reasons. In such situations, the paging indication including the scheduling information of the remaining minimum system information is mapped to the a first resource as described previously (e.g., the first resource 622).

In some embodiments, the first resource carries (e.g., as included in the paging indication) user equipment indication information. The user equipment indication information may be used for paging a particular user equipment. When the paging indication includes user equipment indication information, the system may transmit the paging indication in a sweeping mode, thereby transmitting the paging indication on all antenna ports and thus in all beam directions.

The user equipment indication information may contain a plurality of bits. In some embodiments, each bit of the plurality of bits may correspond to a group of user equipment. The relationship between each bit and a user equipment can be predefined, such as being based on the terminal identifier. As such, the groups of user equipment corresponding to each bit may be formed in a predefined and arbitrary fashion. This approach may be beneficial as allowing the base station to page a group of terminals under the same paging occasion.

Figure 12:
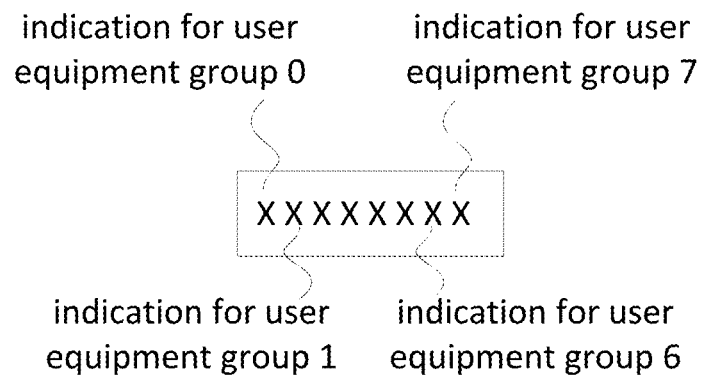
FIG. 12 is a diagram of a data structure for transmitting user equipment indication information.

FIG. 12 is a diagram of an exemplary data structure 1200 for transmitting user equipment indication information. As shown, the data structure 1200 contains eight bits. With such a data structure, all user equipment can be sorted into one of eight groups. For example, each user equipment's TMSI can be divided by eight, and the remainder value can determine to which group the user equipment belongs. Other techniques are possible. When the data structure 1200 is transmitted as part of the paging indication. A user equipment can check the value for its group (e.g., check bit 3 for a user equipment in group 3). If the bit value is 0, then the user equipment can determine that no response is necessary. If the bit value is 1, then the user equipment can determine that further paging is necessary, and thus provide an appropriate response.

An example can be given of how the user equipment indication information may work. The base station may set a bit to "1" for a group of user equipment to which a user equipment belongs that the base station will attempt to page (i.e., set the bit for the group of the user equipment that is being called). When each user equipment in the indicated group receives the user equipment indication information, each such user equipment can respond by transmitting an indication of the beam direction in which it is located or the antenna port by which the base station transmits. The base station may then subsequently send paging downlink control information and/or a paging message in the indicated beam direction or on the indicated antenna port. This subsequent transmission of the paging downlink control information and/or paging message can indicate which user equipment is/are being paged from amongst the group of user equipment.

In some embodiments, the first resource carries (e.g., as included in the paging indication) paging transmission mode indication information. The paging transmission mode indication information may be used to identify a mode by which a paging message will be transmitted, as discussed further below. When the paging indication includes paging transmission mode indication information, the system may transmit the paging indication in a sweeping mode, thereby transmitting the paging indication on all antenna ports and thus in all beam directions.

The paging transmission mode indication information may indicate the paging transmission mode to the groups of user equipment using, for example, by transmitting user equipment indication information as described above along with separate bits for each group for the paging transmission mode indication information (e.g., one to two bits for each group). One benefit of indicating paging transmission mode by groups is that it enables different groups of terminals to use different paging transmission modes. Thus even with two user equipment that belong to two different user equipment groups, both user equipment groups can be indicated in a single paging indication, and additionally each group can have a separate paging transmission mode indicated in the same paging indication. However, in some embodiments, a single paging transmission mode indicator can be used for all user equipment groups in a paging indication, in which case all user equipment groups would use the same indicated paging transmission mode.

In some embodiments three paging transmission modes may be available.

In mode 1, the base station transmits the paging indication and receives a response in a random access request preamble sequence. The base station then transmits the paging downlink control information and/or paging message in the downlink antenna port indicated by the random access preamble sequence.

In mode 2, the base station transmits the paging indication and receives a response in a random access request preamble sequence. The base station then transmits a random access response in a downlink antenna port indicated by the random access preamble sequence, with the random access response including the identifier (e.g., S-TMSI) of the user equipment being paged. In this mode, the base station may further accept the re-random access of the paged user equipment.

In mode 3, the base station transmits the paging indication and receives a response in a random access request preamble sequence. The base station then transmits a random access response in a downlink antenna port indicated by the random access preamble sequence, with the random access response including: the identifier (e.g., S-TMSI) of the user equipment being paged, a timing advance command, and uplink grant information. The base station can then return a contention resolution message to the user equipment that is successfully accessed by the user equipment being paged.

In some embodiments, the paging indication can include a combination of the other elements previously described. For example, a paging indication can contain a user equipment indication information and paging transmission mode indication information. Other combinations of information in the paging indication are possible in accordance with various embodiments of the present disclosure.

Figure 13:
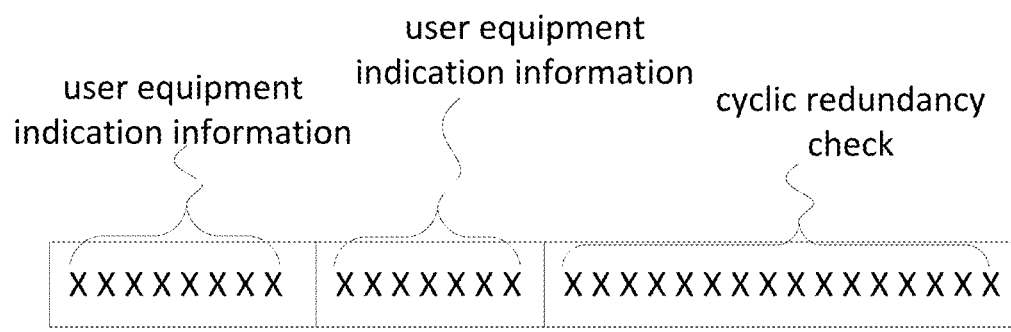
FIG. 13 is a diagram of a data structure for transmitting user equipment indication information and paging reason category indication information.

FIG. 13 is a diagram of a data structure 1300 for transmitting user equipment indication information and paging reason category indication information. The data structure 1300 includes eight bits for transmitting user equipment indication information (e.g., as described with respect to the data structure 1200), seven bits for transmitting paging reason category indication information (e.g., as described with respect to the data structures 1310, 1320, 1330, 1340), and sixteen bits for a cyclic redundancy check. In some embodiments, the bits of the cyclic redundancy check may be scrambled using the P-RNTI. In various embodiments, the number of bits allocated to each type of information can be varied, and the above number of bits for each type of information is given for exemplary purposes only.

The information carried on the first resource may be pre-defined by the system or may be notified to the user equipment by signaling. For example, the base station may indicate in the PBCH what information is contained in the current first resource. As another example, different types of paging indications may be defined which include different information, and the base station may indicate in the PBCH the current type of information carried by the first resource. Alternatively, the user equipment may determine the current type of information carried by the first resource by way of a blind detection. For example, different types of first resources with different CRC masks, or different scrambling codes for the encoded information bits, etc. may be used. The user equipment may blindly detect the current CRC code, or a different scrambling code for the encoded information bits in order to determine the current type of information carried by the first resource.

Figure 14:
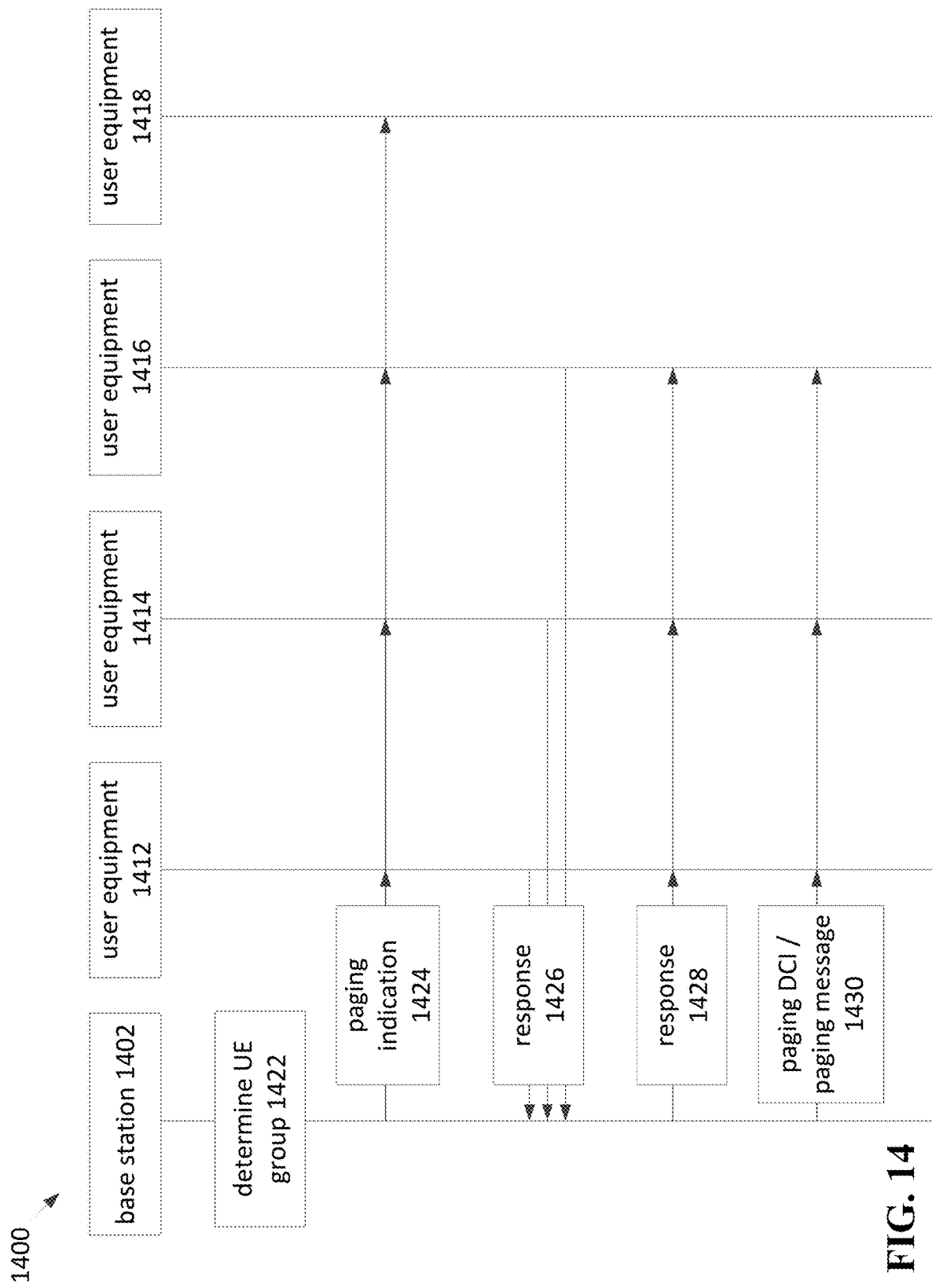
FIG. 14 is a sequence diagram of a process for paging transmission.

FIG. 14 is a sequence diagram of a process 1400 for paging transmission. The process 1400 may be referred to herein as mode 1. The process 1400 involves a base station 1402 (e.g., as described for base station 102, 302, 402, 502, wireless communication apparatus 200) and user equipment

1412, 1414, 1416, 1418 (e.g., as described for user equipment 106, 312, 404, 512, wireless communication apparatus 200). In some embodiments, the user equipment 1412, 1414, 1416, 1418 belong to a same paging occasion (PO). Paging occasion is defined as time resource corresponding to a sweeping structure for paging transmission in different antenna ports. User equipments can be divided into different POs basing on the user equipment identification. In paging trigger mode, the time resource corresponding to a sweeping structure used for paging indications transmission can be defined as PO. In some embodiments, methods are described under the case that user equipments belong to a same PO. In the present example, the base station 1402 may have antennas and antenna ports that correspond to 20 beam directions.

The user equipment 1412, 1414, 1416, 1418 may each belong to user equipment groups. For example, the user equipment 1412, 1414, 1416 may belong to user group 4, while the user equipment 1418 may belong to user group 5.

The user equipment 1412, 1414, 1416, 1418 may be present in beam directions of the cell serviced by the base station 1402. For example, the user equipment 1412 may be present in beam direction 3 and serviced by antenna port 3. The user equipment 1414 may be present in a beam direction 6 and serviced by antenna port 6. The user equipment 1416 may be present in a beam direction 8 and serviced by antenna port 8. The user equipment 1418 may be present in a beam direction 9 and serviced by antenna port 9.

Prior to beginning the process 1400, the base station 1402 may determine that it is necessary to page the user equipment 1412 and the user equipment 1414 (e.g., the network notifies the base station 1402 of incoming calls for the user equipment 1412, 1414)

The base station 1402 determines a user equipment group 1422. The base station 1402 may determine the user equipment group 1422 by determining to which groups the user equipment that need to be paged belong. In this example, the base station 1402 would determine the user equipment group 4, because both of the user equipment that need to be paged (i.e., the user equipment 1412, 1414) belong to the user equipment group 4.

The base station transmits paging indication 1424. The base station 1402 may transmit the paging indication 1424 on all antenna ports in a sweeping fashion. As such, all user equipment present in the cell serviced by the base station 1402 (or at least all such user equipment that are awake during this paging occasion), including each of the user equipment 1412, 1414, 1416, 1418, will receive the paging indication 1424.

The paging indication 1424 may include user equipment indication information. For example, the paging indication may contain eight bits (e.g., XXXXXXXX as described with respect to the data structure 1200) that identify which user equipment groups are being paged. In the present example, the user equipment indication information may be 00001000 to indicate that only the user equipment group 4 is being paged.

The paging indication 1424 may further include paging transmission mode indication information to indicate a paging transmission mode that the base station will use. Because the base station 1402 is using mode 1, the paging transmission mode indication information may indicate a value of 1 (e.g., 01).

In some embodiments, the paging indication 1424 may include further information. For example, the paging indication 1424 may include paging downlink control information will the CRC scrambled using the P-RNTI as a mask. The paging indication may contain scheduling information for the paging message that will be transmitted.

When the user equipment 1412, 1414, 1416, 1418 receive the paging indication 1424, each can determine whether or not it is in the user equipment group 1422 being paged. The user equipment 1418 determines that it is not in the user equipment group 1422 being paged (because bit 5 of the user equipment indication information is set to 0), so the user equipment 1418 takes no further action (e.g., returns to idle mode).

Each of the user equipment 1412, 1414, 1416 determine that they are in the user equipment group 1422 being paged (because bit 4 of the user equipment indication information is set to 1), so each of the user equipment 1412, 1414, 1416 prepare to send a response 1426 to the paging indication. The response 1426 from each of the user equipment 1412, 1414, 1416 may include an indication of the antenna port in which the each user equipment is located. For example, each of the user equipment 1412, 1414, 1416 may select a resource for transmission of the response 1426 that corresponds to the antenna port where that equipment is located. For example, the user equipment 1412 may transmit the response 1426 on a resource corresponding to antenna port 3. The user equipment 1414 may transmit the response 1426 on a resource corresponding to antenna port 6. The user equipment 1416 may transmit the response 1426 on a resource corresponding to antenna port 8.

In some embodiments, the user equipment 1412, 1414, 1416 may transmit the response 1426 as a preamble on a random access channel (RACH). In some situations, this preamble may be part of what would otherwise be called a "request" on the random access channel. But in the present example, the user equipment 1412, 1414, 1416 may use the random access channel "request" in order to send the response 1426 to the base station 1402.

In some embodiments, the base station 1402 may send a response 1428 to each of the received responses 1426. The response 1428 may serve to notify each of the user equipment 1412, 1414, 1416 that the response 1426 was in fact received by the base station 1402. In some embodiments, the response 1428 may be transmitted on the random access channel as a random access response (RAR) message in response to the preamble containing the response 1426. In such embodiments, the RAR of the response 1428 may only contain a random access preamble identification (RAPID) that indicated the user equipment whose preamble the current RAR corresponds to. In some embodiments, the base station may omit transmission of the response 1428.

The base station 1402 transmits a paging downlink control information and/or paging message 1430. The base station 1402 may transmit the paging message 1430 using a standard paging channel (e.g., PCCH/PCH). Based on the responses 1426, the base station 1402 can determine a subset of the total beam directions or antenna ports into which the paging message 1430 should be transmitted. In the present example, the base station 1402 determines that the paging message 1430 only needs to be transmitted to beam directions/antenna ports 3, 6, and 8 of the 20 total beam directions/antenna ports, because all members of the user equipment group 1422 being paged (i.e., user equipment group 4) are in those three directions. As a result, the base station 1402 transmits the paging message 1430 only to the antenna ports for the beam directions 3, 6, and 8. Because the user equipment 1412, 1414, 1416 are each in one of the directions to which the paging message 1430 was transmitted, each of the user equipment 1412, 1414, 1416 will receive the paging message 1430.

In some embodiments, the base station 1402 may additionally send related information, such as paging downlink control information to the identified beam directions/antenna ports (i.e., directions 3, 6, 8). In some embodiments, the base station 1402 may transmit the paging message 1430 during the next paging occasion after the transmission of the paging indication 1424 that corresponds to the user equipment being paged. Alternatively, the paging message 1430 may be transmitted in a predefined time-frequency resource.

In some embodiments, the paging message 1430 may contain an identifier for each user equipment actually being paged. In the present example, the paging message 1430 would contain identifiers (e.g., S-TMSI) for the user equipment 1412 and the user equipment 1414. After receiving the paging message 1430, each of the user equipment 1412, 1414, 1416 can determine if it was being paged. The user equipment 1416 would determine that it is not being paged, because its identifier was not included in the paging message 1430. Whereas the user equipment 1412, 1414 would each determine that it was being paged, because its identifier was included in the paging message 1430. User equipment that determine that they are being paged may perform a random access procedure on the random access channel in order to access the network in accordance with the paging message 1430.

Figure 15:
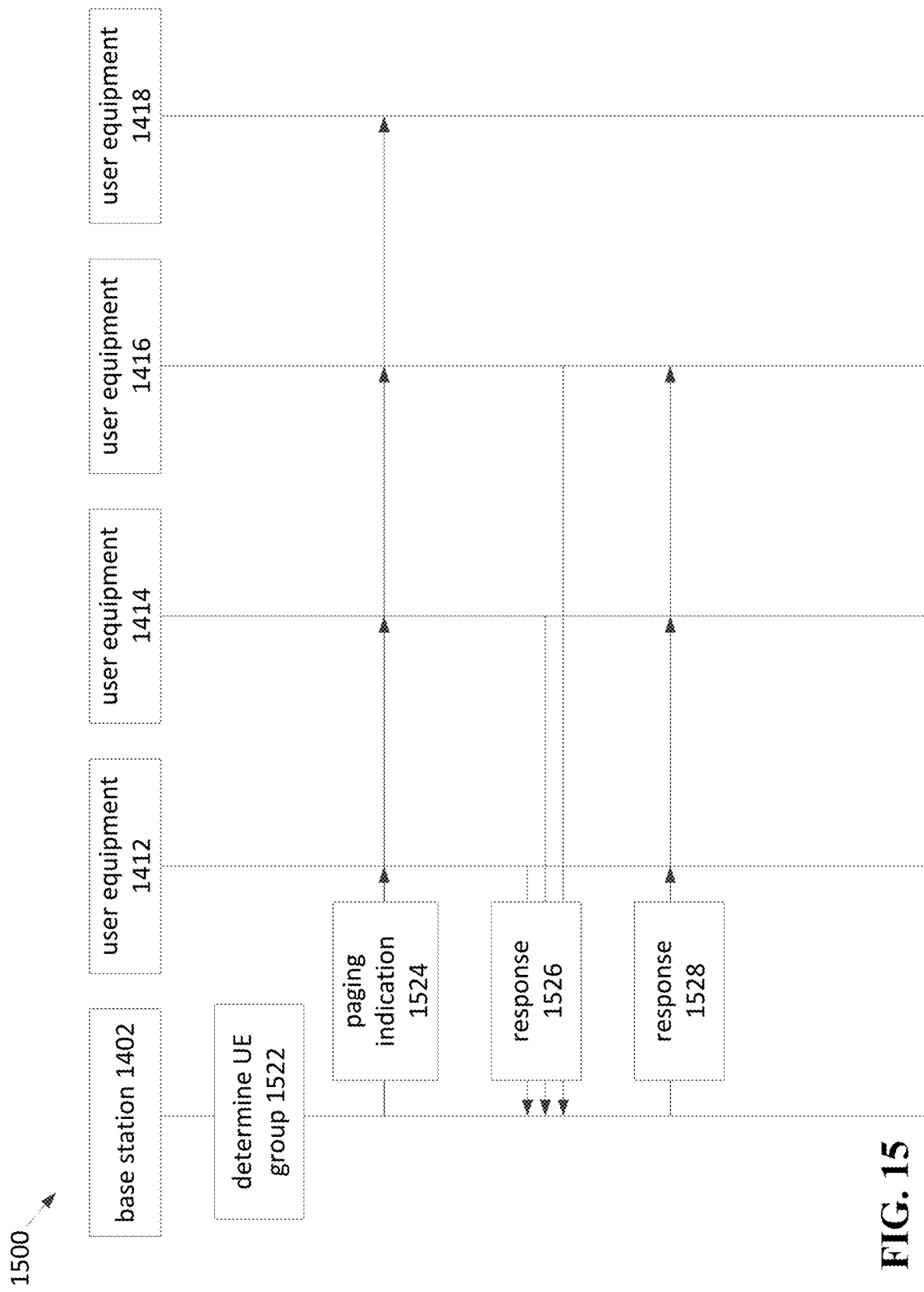
FIG. 15 is a sequence diagram of a process for paging transmission.

FIG. 15 is a sequence diagram of a process 1500 for paging transmission. The process 1500 may be referred to herein as mode 2. The process 1500 involves the base station 1402 and the user equipment 1412, 1414, 1416, 1418 (e.g., as described for user equipment 106, 312, 404, 512, wireless communication apparatus 200).

As described previously, the base station 1402 may have antennas and antenna ports that correspond to 20 beam directions. The user equipment 1412, 1414, 1416 may belong to user group 4, while the user equipment 1418 may belong to user group 5. The user equipment 1412 may be present in beam direction 3 and serviced by antenna port 3. The user equipment 1414 may be present in a beam direction 6 and serviced by antenna port 6. The user equipment 1416 may be present in a beam direction 8 and serviced by antenna port 8. The user equipment 1418 may be present in a beam 9 direction and serviced by antenna port 9.

Prior to beginning the process 1500, the base station 1402 may determine that it is necessary to page the user equipment 1412 and the user equipment 1414 (e.g., the network notifies the base station 1402 of incoming calls for the user equipment 1412, 1414).

The base station 1402 determines a user equipment group 1522. The base station 1402 may determine the user equipment group 1522 by determining to which groups the user equipment that need to be paged belong. In this example, the base station 1402 would determine the user equipment group 4, because both of the user equipment that need to be paged (i.e., the user equipment 1412, 1414) belong to the user equipment group 4.

The base station transmits paging indication 1524. The base station 1402 may transmit the paging indication 1524 on all antenna ports for all beam directions in a sweeping fashion. As such, all user equipment present in the cell serviced by the base station 1402 (or at least all such user equipment that are awake during this paging occasion), including each of the user equipment 1412, 1414, 1416, 1418, will receive the paging indication 1524.

The paging indication 1524 may include user equipment indication information. For example, the paging indication may contain eight bits (e.g., XXXXXXXX as described with respect to the data structure 1200) that identify which user equipment groups are being paged. In the present example, the user equipment indication information may be 00001000 to indicate that only the user equipment group 4 is being paged.

The paging indication 1524 may further include paging transmission mode indication information to indicate a paging transmission mode that the base station will use. Because the base station 1402 is using mode 2, the paging transmission mode indication information may indicate a value of 2 (e.g., 10).

In some embodiments, the paging indication 1524 may include further information. For example, the paging indication 1524 may include paging downlink control information will the CRC scrambled using the P-RNTI as a mask. The paging indication may contain scheduling information for the paging message that will be transmitted.

When the user equipment 1412, 1414, 1416, 1418 receive the paging indication 1524, each can determine whether or not it is in the user equipment group 1522 being paged. The user equipment 1418 determines that it is not in the user equipment group 1522 being paged (because bit 5 of the user equipment indication information is set to 0), so the user equipment 1418 takes no further action (e.g., returns to idle mode).

Each of the user equipment 1412, 1414, 1416 determine that they are in the user equipment group 1522 being paged (because bit 4 of the user equipment indication information is set to 1), so each of the user equipment 1412, 1414, 1416 prepare to send a response 1526 to the paging indication. The response 1526 from each of the user equipment 1412, 1414, 1416 may include an indication of the antenna port in which each of the user equipment 1412, 1414, 1416 is located. For example, each of the user equipment 1412, 1414, 1416 may select a resource for transmission of the response 1526 that corresponds to the antenna port where that user equipment is located. For example, the user equipment 1412 may transmit the response 1526 on a resource for antenna port 3. The user equipment 1414 may transmit the response 1526 on a resource for antenna port 6. The user equipment 1416 may transmit the response 1526 on a resource for antenna port 8.

In some embodiments, the user equipment 1412, 1414, 1416 may transmit the response 1526 as a preamble on a random access channel (RACH). In some situations, this preamble may be part of what would otherwise be called a "request" on the random access channel. But in the present example, the user equipment 1412, 1414, 1416 may use the random access channel "request" in order to send the response 1526 to the base station 1402.

The base station 1402 transmits a response 1528. The base station 1402 may transmit the response 1528 as a random access response (RAR) message on the same random access channel on which it receive the response 1526. The response 1528 may contain the paging message that the base station 1402 is attempting to deliver to the user equipment being paged. That is, mode 1 and mode 2 differ, at least in that mode 1 transmits the paging message on a standard paging channel (e.g., PCCH/PCH) whereas mode 2 transmits the paging message as part of a response on the random access channel (RACH).

Based on the responses 1526, the base station 1402 can determine a subset of the total beam directions/antenna ports into which the response 1528 should be transmitted. In the present example, the base station 1402 determines that the response 1528 only needs to be transmitted to beam directions/antenna ports 3, 6, and 8 of the 20 total beam directions/antenna ports, because all members of the user equipment group 1522 being paged (i.e., user equipment group 4) are in those three directions. As a result, the base station 1402 transmits the response 1528 only to the antenna ports for the beam directions 3, 6, and 8. Because the user equipment 1412, 1414, 1416 are each in one of the directions to which the response 1528 was transmitted, each of the user equipment 1412, 1414, 1416 will receive the response 1528.

In some embodiments, the response 1528 may contain an identifier for each user equipment actually being paged. In the present example, the response 1528 would contain identifiers (e.g., S-TMSI) for the user equipment 1412 and the user equipment 1414. After receiving the response 1528, each of the user equipment 1412, 1414, 1416 can determine if it was being paged. The user equipment 1416 would determine that it is not being paged, because its identifier was not included in the response 1528. Whereas the user equipment 1412, 1414 would each determine that it was being paged, because its identifier was included in the response 1528. User equipment that determine that they are being paged may perform a random access procedure on the random access channel in order to access the network in accordance with the response 1530.

In the process 1500, the receiving configuration of the RAR of the response 1528 may be configured to the user equipment in the remaining minimized system information (RMSI). The user equipment can detect the RAR of the response 1528 in a plurality of physical downlink control channels within the corresponding RAR window. The RAR scheduling information can scramble the CRC of the downlink control information with the RA-RNTI as a mask. The RAR of the response 1528 also can include the corresponding random access preamble identification (RAPID) to indicate the user equipment to which preamble the RAR of the response 1528 corresponds. The RAR of the response 1528 does not need to include timing advance indication and uplink authorization information.

Figure 16:
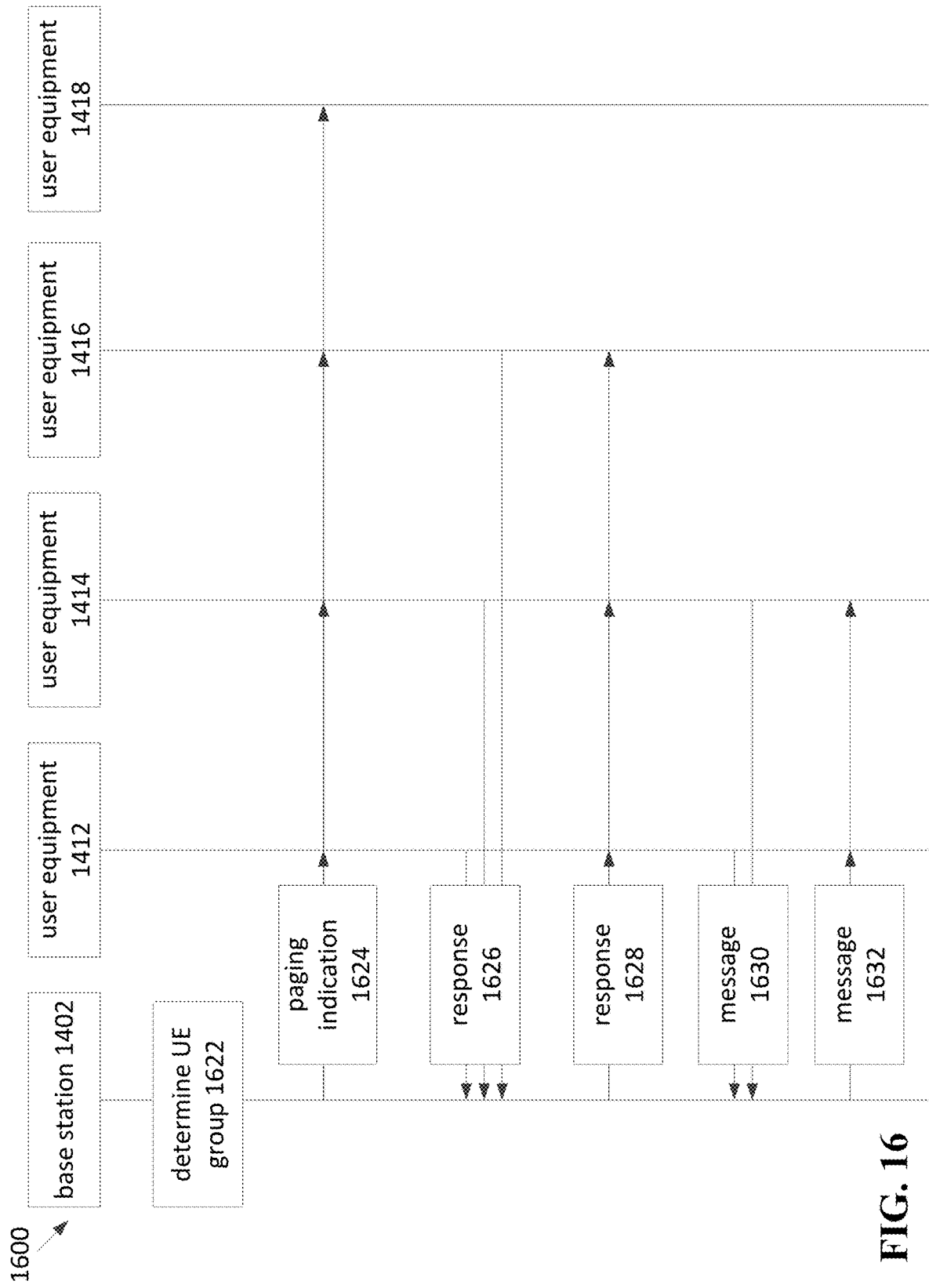
FIG. 16 is a sequence diagram of a process for paging transmission.

FIG. 16 is a sequence diagram of a process 1600 for paging transmission. The process 1600 may be referred to herein as mode 3. The process 1600 involves the base station 1402 and the user equipment 1412, 1414, 1416, 1418 (e.g., as described for user equipment 106, 312, 404, 512, wireless communication apparatus 200).

As described previously, the base station 1402 may have antennas and antenna ports that correspond to 20 beam directions. The user equipment 1412, 1414, 1416 may belong to user group 4, while the user equipment 1418 may belong to user group 5. The user equipment 1412 may be present in beam direction 3 and service by antenna port 3. The user equipment 1414 may be present in a beam direction 6 and service by antenna port 6. The user equipment 1416 may be present in a beam direction 8 and service by antenna port 8. The user equipment 1418 may be present in a beam direction 9 and service by antenna port 9.

Prior to beginning the process 1600, the base station 1402 may determine that it is necessary to page the user equipment 1412 and the user equipment 1414 (e.g., the network notifies the base station 1402 of incoming calls for the user equipment 1412, 1414).

The base station 1402 determines a user equipment group 1622. The base station 1402 may determine the user equipment group 1622 by determining to which groups the user equipment that need to be paged belong. In this example, the base station 1402 would determine the user equipment group 4, because both of the user equipment that need to be paged (i.e., the user equipment 1412, 1414) belong to the user equipment group 4.

The base station transmits paging indication 1624. The base station 1402 may transmit the paging indication 1624 on all antenna ports for all beam directions in a sweeping fashion. As such, all user equipment present in the cell serviced by the base station 1402 (or at least all such user equipment that are awake during this paging occasion), including each of the user equipment 1412, 1414, 1416, 1418, will receive the paging indication 1624.

The paging indication 1624 may include user equipment indication information. For example, the paging indication may contain eight bits (e.g., XXXXXXXX as described with respect to the data structure 1200) that identify which user equipment groups are being paged. In the present example, the user equipment indication information may be 00001000 to indicate that only the user equipment group 4 is being paged.

The paging indication 1624 may further include paging transmission mode indication information to indicate a paging transmission mode that the base station will use. Because the base station 1402 is using mode 3, the paging transmission mode indication information may indicate a value of 3 (e.g., 11).

In some embodiments, the paging indication 1624 may include further information. For example, the paging indication 1624 may include paging downlink control information will the CRC scrambled using the P-RNTI as a mask. The paging indication may contain scheduling information for the paging message that will be transmitted.

When the user equipment 1412, 1414, 1416, 1418 receive the paging indication 1624, each can determine whether or not it is in the user equipment group 1622 being paged. The user equipment 1418 determines that it is not in the user equipment group 1622 being paged (because bit 5 of the user equipment indication information is set to 0), so the user equipment 1418 takes no further action (e.g., returns to idle mode).

Each of the user equipment 1412, 1414, 1416 determine that they are in the user equipment group 1622 being paged (because bit 4 of the user equipment indication information is set to 1), so each of the user equipment 1412, 1414, 1416 prepare to send a response 1626 to the paging indication. The response 1626 from each of the user equipment 1412, 1414, 1416 may include an indication of the antenna port in which the each user equipment is located. For example, each of the user equipment 1412, 1414, 1416 may select a resource for transmission of the response 1626 that corresponds to the antenna port where that user equipment is located. For example, the user equipment 1412 may transmit the response 1626 on a resource corresponding to antenna port 3. The user equipment 1414 may transmit the response 1626 on a resource corresponding to antenna port 6. The user equipment 1416 may transmit the response 1626 on a resource corresponding to antenna port 8.

In some embodiments, the user equipment 1412, 1414, 1416 may transmit the response 1626 as a preamble on a random access channel (RACH). In some situations, this preamble may be part of what would otherwise be called a "request" on the random access channel. But in the present example, the user equipment 1412, 1414, 1416 may use the random access channel "request" in order to send the response 1626 to the base station 1402.

The base station 1402 transmits a response 1628. The base station 1402 may transmit the response 1628 as a random access response (RAR) message on the same random access channel on which it receive the response 1526. The response 1628 may contain the paging message that the base station 1402 is attempting to deliver to the user equipment being paged. That is, mode 1 and mode 3 differ, at least in that mode 1 transmits the paging message on a standard paging channel (e.g., PCCH/PCH) whereas mode 3 transmits the paging message as part of a response on the random access channel (RACH).

Based on the responses 1626, the base station 1402 can determine a subset of the total beam directions/antenna ports into which the response 1628 should be transmitted. In the present example, the base station 1402 determines that the response 1628 only needs to be transmitted to beam directions/antenna ports 3, 6, and 8 of the 20 total beam directions/antenna ports, because all members of the user equipment group 1622 being paged (i.e., user equipment group 4) are in those three directions. As a result, the base station 1402 transmits the response 1528 only to the antenna ports for the beam directions 3, 6, and 8. Because the user equipment 1412, 1414, 1416 are each in one of the directions to which the response 1628 was transmitted, each of the user equipment 1412, 1414, 1416 will receive the response 1628.

In some embodiments, the response 1628 may contain an identifier for each user equipment actually being paged, as well as a timing advance indication and an uplink authorization. In the present example, the response 1628 would contain identifiers (e.g., S-TMSI) for the user equipment 1412 and the user equipment 1414. After receiving the response 1628, each of the user equipment 1412, 1414, 1416 can determine if it was being paged. The user equipment 1416 would determine that it is not being paged, because its identifier was not included in the response 1628. Whereas the user equipment 1412, 1414 would each determine that it was being paged, because its identifier was included in the response 1628.

User equipment that determine that they are being paged may use the timing advance indication and the uplink authorization in order to establish access to the network. In particular, the user equipment identified in the response 1628 (e.g., the user equipment 1412, 1414) can continue to send a message 1630 according to the uplink authorization provided in the response 1628. The base station 1402 can then transmit the message 1632 to confirm to each of the user equipment 1412, 1414 that transmitted the message 1632 that it has successfully accessed the network. That is, mode 2 and mode 3 differ, at least in that mode 2 uses the RAR (the response 1528) to identify the user equipment being paged, whereas mode 3 uses the RAR (the response 1628) to both identify the user equipment being paged and provide uplink authorization for the subsequent network access needed by the paged user equipment.

Figure 17:
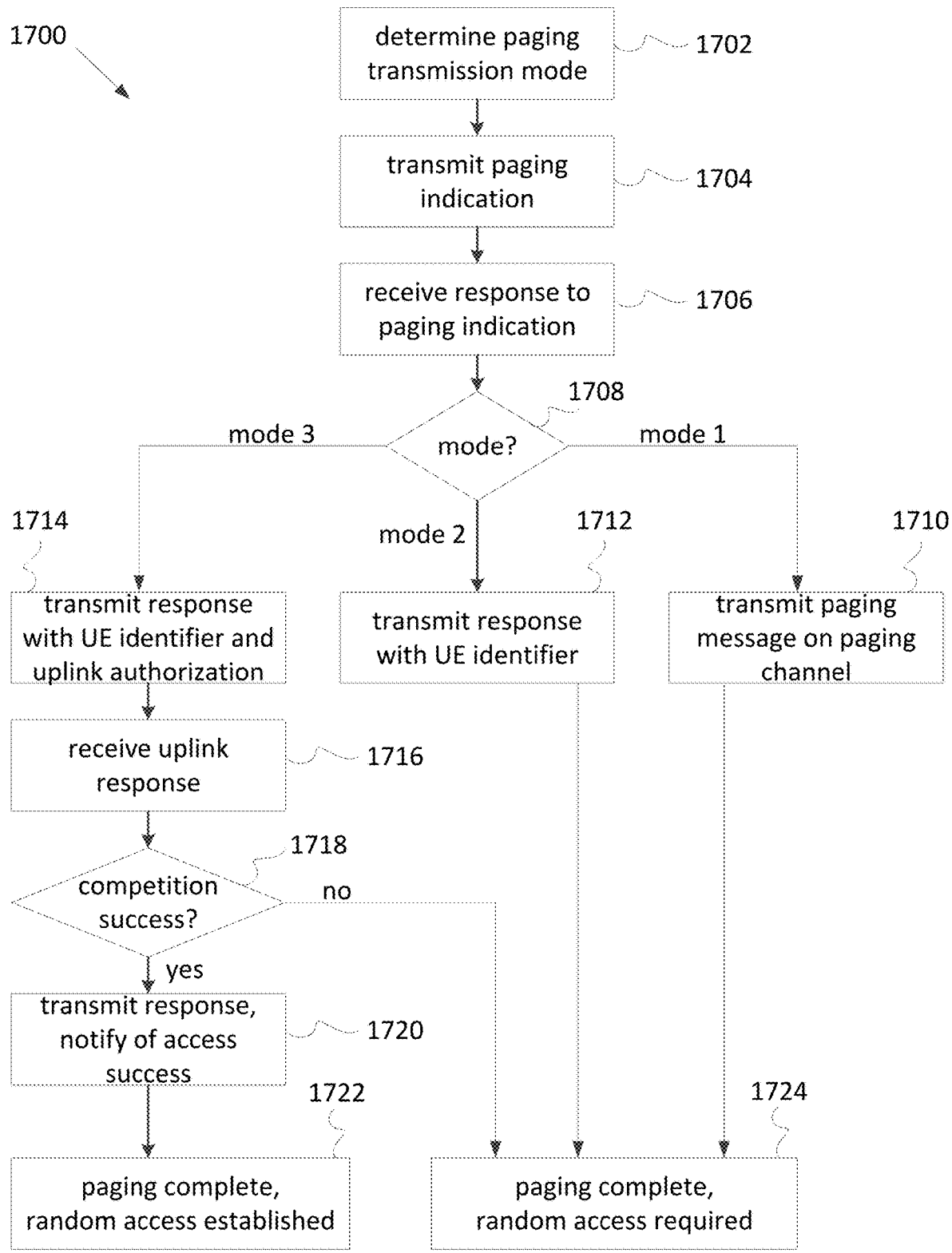
FIG. 17 is a flowchart of a process for paging transmission using multiple paging transmission modes.

FIG. 17 is a flowchart of a process 1700 for paging transmission using multiple paging transmission modes. The process 1700 may be performed by a base station (e.g., as described for base station 102, 302, 402, 502, 1402, wireless communication apparatus 200) in communication with one or more user equipment (e.g., as described for user equipment 106, 312, 404, 512, 1412, wireless communication apparatus 200).

Prior to beginning the process 1700, the base station may determine that it is necessary to page specific user equipment (e.g., the network notifies the base station of an incoming call for the user equipment). Though not depicted in the process 1700, the base station may determine a user equipment group based on the user equipment that is to be paged (e.g., as described with respect to user equipment group 1422).

At block 1702, the base station determines a paging transmission mode. The base station may determine the paging transmission mode by selecting one transmission mode from a group of available transmission modes (e.g., modes 1, 2, and 3 as described herein). A transmission mode may be considered "available" to the base station if the transmission mode involves a sequence of communications which the base station is configured and/or capable of performing.

The base station may determine the paging transmission mode using any of a variety of factors. For example, the base station may choose a paging transmission mode that is predefined as a default paging transmission mode. As another example, the base station may choose a paging transmission mode based on the expected number of user equipment in the user equipment group that is to be paged. For instance, modes 1 and 2 may be more efficient for paging a user equipment in a large group of user equipment (e.g., because contention in mode 3 would result in many collision and thus would be inefficient), whereas mode 3 may be more efficient for paging a user equipment in a small group of user equipment (e.g., because random access established as part of paging transmission). As another example, the network may indicate to the base station what paging transmission mode to use.

At block 1704, the base station transmits a paging indication. The base station may transmit the paging indication as described elsewhere herein (e.g., as described with respect to paging indication 1424, 1524, 1624). One or more user equipment located in more than one antenna port for the base station may receive the paging indication. The user equipment that receive the paging indication may use user equipment indication information contained in the paging indication in order to determine if the user equipment is part of a group that is being triggered to provide a response.

At block 1706, the base station receives one or more responses from user equipment. In particular, all user equipment in the groups identified by the user equipment indication information (transmitted as part of the paging indication at the block 1704) may provide a response to the base station using a message preamble transmitted on the random access channel. Each response received by the base station at the block 1706 may include an indication of a beam direction/antenna port in which the sending user equipment is present.

At block 1708, the process 1700 branches based on which paging transmission mode was selected at the block 1702. If mode 1 was selected, then the process 1700 continues at block 1710. If mode 2 was selected, then the process 1700 continues at block 1712. If mode 3 was selected, then the process 1700 continues at block 1714.

At block 1710, the base station transmits a paging message on the paging channel. The base station may transmit a standard paging message on a standard paging channel (e.g., PCCH/PCH). The base station may only transmit the paging message to those beam directions/antenna ports that were indicated by the responses received at the block 1706. The paging message may include identification information for the user equipment being paged. Each of the user equipment that receive the paging message may use the identification information to determine if it is being paged. After the completion of the block 1710, the user equipment that is being paged has completed paging, but the user equipment has yet to establish uplink access over a random access channel (e.g., RACH) (block 1724).

At block 1712, the base station transmits a response message with the identifier for the user equipment being paged. The base station may transmit the response as a random access response (RAR) on the same random access channel on which the responses were received at the block 1706. The response may include identification information for the user equipment being paged. Each of the user equipment that receive the response may use the identification information to determine if it is being paged. After the completion of the block 1712, the user equipment that is being paged has completed paging, but the user equipment has yet to establish uplink access over a random access channel (e.g., RACH) (block 1724).

At block 1714, the base station transmits a response message with the identifier for the user equipment being paged as well as uplink authorization information. The base station may transmit the response as a random access response (RAR) on the same random access channel on which the responses were received at the block 1706. The response may include identification information for the user equipment being paged. Each of the user equipment that receive the response may use the identification information to determine if it is being paged.

At block 1716, the base station receives one or more uplink responses. The base station may receive the one or more uplink responses on the same random access channel on which the responses were received at the block 1706 and on which the responses was transmitted at the block 1714. In particular, the responses received at the block 1716 may be random access messages made by the user equipment that are being paged in order to secure access to the network on the uplink random access channel. The user equipment may use the uplink authorization information transmitted by the base station at the block 1714 to send the response received by the base station at the block 1716.

At block 1718, a determination is made as to whether the uplink response received at the block 1716 was successful or not. In particular, as a user equipment that is being paged attempts to send a response on the uplink random access channel, it will be contending for resources on that channel with other user equipment. If the user equipment succeeds in contending for the uplink random access channel, then the process 1700 continues at block 1720. If the user equipment does not succeed in contending for the uplink random access channel, then the user equipment that is being paged has completed paging, but the user equipment has yet to establish uplink access over a random access channel (e.g., RACH) (block 1724).

At block 1720, the base station transmits a response to the user equipment to notify the user equipment of its success in contending for the uplink random access resources. The base station may transmit the response at block 1720 on the same random access channel on which the responses were received at the block 1706, on which the responses was transmitted at the block 1714, and on which the responses were received at the block 1716. After the completion of the block 17120, the user equipment that is being paged has completed paging, and the user equipment has also established uplink access over a random access channel (e.g., RACH) (block 1722).

In some embodiments, the paging indication transmitted at the block 1704 may include paging transmission mode indication information. For example, the paging indication may include a two bit identifier of the paging transmission mode (as selected at the block 1702) for each user equipment group. For instance, if there are eight user equipment groups, there may be 16 bits allocated to indicating the paging transmission mode for the user equipment groups. In such embodiments, the two bits may indicate the paging transmission mode being used (e.g., 01=mode 1, 10=mode 2, 11=mode 3). As such, a user equipment that is a member of a user equipment group indicated by the user equipment indication information in the paging indication may use the two bits corresponding to its user equipment group to determine how it should proceed with subsequent paging activity (e.g., monitor the paging channel for mode 1, monitor the random access channel for modes 2 and 3). Alternatively, a single paging transmission mode indication may be used for all user equipment groups, in which case all user equipment may use the same indicated paging transmission mode.

Figure 18:
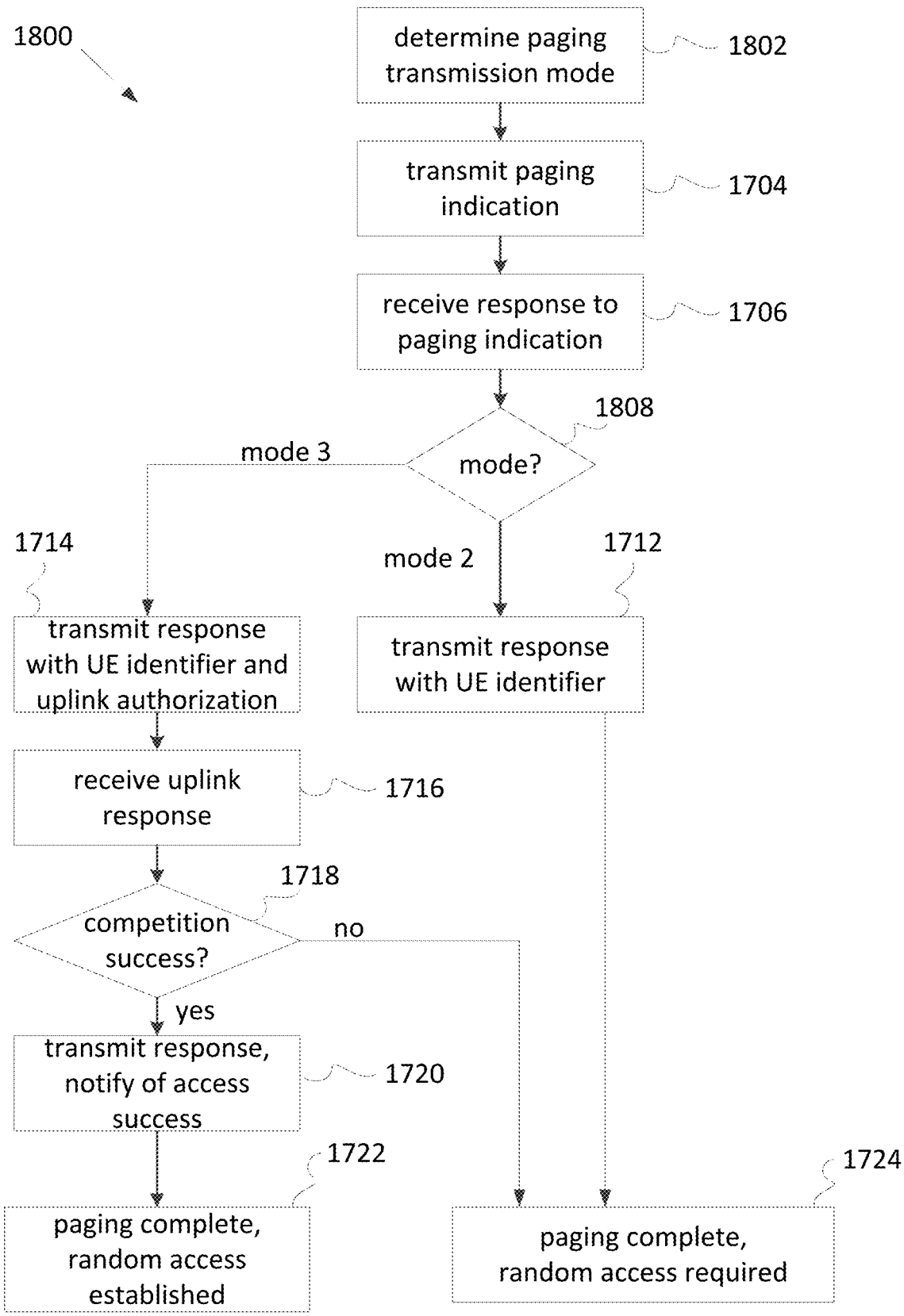
FIG. 18 is a flowchart of a process for paging transmission using multiple paging transmission modes.

FIG. 18 is a flowchart of a process 1800 for paging transmission using multiple paging transmission modes. The process 1700 may be performed by a base station (e.g., as described for base station 102, 302, 402, 502, 1402, wireless communication apparatus 200) in communication with one or more user equipment (e.g., as described for user equipment 106, 312, 404, 512, 1412, wireless communication apparatus 200). The process 1800 may be provided substantially as described with respect to the process 1700, with like reference numerals indicating like elements. Distinctions between the process 1700 and the process 1800 are noted below.

At block 1802, the base station determines a paging transmission mode. The base station may determine the paging transmission mode by selecting one transmission mode from a group of available transmission modes (e.g., modes 2 and 3 as described herein). A transmission mode may be considered "available" to the base station if the transmission mode involves a sequence of communications which the base station is configured and/or capable of performing. As opposed to the block 1702 in the process 1700, the block 1802 in the process 1800 may involve the base station selecting a paging transmission mode from a smaller number of available transmission modes. There may be fewer paging transmission modes available due to a smaller number of paging transmission modes supported by the base station or the user equipment with which it is in communication. The base station may determine the paging transmission mode using any of a variety of factors, such as the exemplary factors described for the block 1702.

At block 1808, the process 1800 branches based on which paging transmission mode was selected at the block 1802. If mode 2 was selected, then the process 1800 continues at block 1712. If mode 3 was selected, then the process 1800 continues at block 1714.

It should be understood that embodiments described herein may be used with more or fewer paging transmission modes than those described herein.

From the foregoing, it will be appreciated that specific embodiments of the invention have been described herein for purposes of illustration, but that various modifications may be made without deviating from the scope of the invention. Accordingly, the invention is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for paging user equipment in a wireless network, comprising:
    mapping, by a network node, a paging indication to one or more resource elements, wherein the one or more resource elements are resource elements in one or more symbols of a synchronization signal that are not mapped by the synchronization signal, and wherein the paging indication comprises an indicator of a paging transmission mode;
    selecting the paging transmission mode from among a plurality of available transmission modes, wherein a first of the plurality of available transmission modes comprises configuring a subsequent transmission of a paging downlink control and/or a paging message, a second of the plurality of available transmission modes comprises configuring a subsequent transmission of a random access response comprising an identifier of a user equipment being paged, and a third of the plurality of available transmission modes comprises configuring a subsequent transmission of a random access response comprising an identifier of a user equipment being paged, a timing advance command, and uplink grant information;
    mapping a paging reason category indication information to the one or more resource elements, wherein a paging reason related to the paging reason category indication information comprises a specific paging reason and/or a public paging reason, and wherein the paging indication comprises scheduling information when the paging reason comprises the specific paging reason; and
    transmitting the paging indication to trigger a response from a user equipment for performing subsequent paging.

2. The method of claim 1, wherein the one or more resource elements comprise one or more continuous pluralities of resource elements without a demodulation reference signal mapped to a resource element of the continuous plurality of resource elements.

3. The method of claim 2, further comprising:
    mapping a demodulation reference signal to one or more resource elements in one or more physical broadcast channel symbols that are adjacent to at least one of the one or more symbols of the synchronization signal, the demodulation reference signal providing a reference signal for demodulating the paging indication,
    wherein the paging indication shares a same antenna port with the physical broadcast channel.

4. The method of claim 1, wherein the one or more resource elements are outside a bandwidth of the synchronization signal, and wherein the one or more resource elements are inside a bandwidth of one or more physical broadcast channels.

5. The method of claim 1, further comprising:
receiving one or more responses to the paging indication from one or more user equipment; and
transmitting one or more paging messages based on information received in the one or more responses.

6. The method of claim 1, further comprising:
transmitting the paging indication using a plurality of antenna ports;
receiving one or more responses to the paging indication from one or more user equipment, each response indicating at least one antenna port; and
transmitting one or more paging messages using antenna ports indicated in the one or more responses.

7. The method of claim 1, further comprising:
determining a group of user equipment to which one or more user equipment to page belong,
wherein the paging indication includes an indicator for the group of user equipment.

8. The method of claim 1, further comprising:
receiving the paging indication, the paging indication including an indicator for a group of user equipment determined based on incoming data information indicating a user equipment to page.

9. A device for wireless communication, comprising:
a processor in a network node configured to:
map a paging indication to one or more resource elements, wherein the one or more resource elements are resource elements in one or more symbols of a synchronization signal that are not mapped by the synchronization signal, and wherein the paging indication comprises an indicator of a paging transmission mode;
select the paging transmission mode from among a plurality of available transmission modes, wherein a first of the plurality of available transmission modes comprises configuring a subsequent transmission of a paging downlink control and/or a paging message, a second of the plurality of available transmission modes comprises configuring a subsequent transmission of a random access response comprising an identifier of a user equipment being paged, and a third of the plurality of available transmission modes comprises configuring a subsequent transmission of a random access response comprising an identifier of a user equipment being paged, a timing advance command, and uplink grant information;
map a paging reason category indication information to the one or more resource elements, wherein a paging reason related to the paging reason category indication information comprises a specific paging reason and/or a public paging reason, and wherein the paging indication comprises scheduling information when the paging reason comprises the specific paging reason; and
transmit the paging indication to trigger a response from a user equipment for performing subsequent paging.

10. The device of claim 9, wherein the one or more resource elements comprise one or more continuous pluralities of resource elements without a demodulation reference signal mapped to a resource element of the continuous plurality of resource elements.

11. The device of claim 10, wherein the processor is further configured to:
map a demodulation reference signal to one or more resource elements in one or more physical broadcast channel symbols that are adjacent to at least one of the one or more symbols of the synchronization signal, the demodulation reference signal providing a reference signal for demodulation of the paging indication,
wherein the paging indication shares a same antenna port with the physical broadcast channel.

12. The device of claim 9, wherein the one or more resource elements are outside a bandwidth of the synchronization signal, and wherein the one or more resource elements are inside a bandwidth of one or more physical broadcast channels.

13. The device of claim 9, wherein the processor is further configured to:
receive one or more responses to the paging indication from one or more user equipment; and
transmit one or more paging messages based on information received in the one or more responses.

14. The device of claim 9, wherein the processor is further configured to:
transmit the paging indication using a plurality of antenna ports;
receive one or more responses to the paging indication from one or more user equipment, each response indicating at least one antenna port; and
transmit one or more paging messages using antenna ports indicated in the one or more responses.

15. The device of claim 9, wherein the processor is further configured to:
determine a group of user equipment to which one or more user equipment to page belong,
wherein the paging indication includes an indicator for the group of user equipment.

16. The device of claim 9, wherein the processor is further configured to:
receive the paging indication, the paging indication including an indicator for a group of user equipment determined based on incoming data information indicating a user equipment to page.

17. A non-transitory computer readable medium having code stored thereon, the code, when executed by a processor, causing the processor to implement a method for paging user equipment in a wireless network, the method comprising:
mapping, by a network node, a paging indication to one or more resource elements, wherein the one or more resource elements are resource elements in one or more symbols of a synchronization signal that are not mapped by the synchronization signal, and wherein the paging indication comprises an indicator of a paging transmission mode;
selecting the paging transmission mode from among a plurality of available transmission modes, wherein a first of the plurality of available transmission modes comprises configuring a subsequent transmission of a paging downlink control and/or a paging message, a second of the plurality of available transmission modes comprises configuring a subsequent transmission of a random access response comprising an identifier of a user equipment being paged, and a third of the plurality of available transmission modes comprises configuring a subsequent transmission of a random access response comprising an identifier of a user equipment being paged, a timing advance command, and uplink grant information;
mapping a paging reason category indication information to the one or more resource elements, wherein a paging reason related to the paging reason category indication information comprises a specific paging reason and/or a public paging reason, and wherein the paging indication comprises scheduling information when the paging reason comprises the specific paging reason; and transmitting the paging indication to trigger a response from a user equipment for performing subsequent paging.

18. The non-transitory computer readable medium of claim 17, wherein the one or more resource elements comprise one or more continuous pluralities of resource elements without a demodulation reference signal mapped to a resource element of the continuous plurality of resource elements.

19. The non-transitory computer readable medium of claim 18, wherein the method further comprises:

mapping a demodulation reference signal to one or more resource elements in one or more physical broadcast channel symbols that are adjacent to at least one of the one or more symbols of the synchronization signal, the demodulation reference signal providing a reference signal for demodulating the paging indication, wherein the paging indication shares a same antenna port with the physical broadcast channel.

20. The non-transitory computer readable medium of claim 17, wherein the one or more resource elements are outside a bandwidth of the synchronization signal, and wherein the one or more resource elements are inside a bandwidth of one or more physical broadcast channels.

* * * * *

UNITED STATES PATENT AND TRADEMARK OFFICE
CERTIFICATE OF CORRECTION

PATENT NO. : 11,224,028 B2
APPLICATION NO. : 16/785645
DATED : January 11, 2022
INVENTOR(S) : Xing Liu et al.

It is certified that error appears in the above-identified patent and that said Letters Patent is hereby corrected as shown below:

In the Specification

In Column 2, Line 10, delete "channel." and insert -- channels. --, therefor.

In Column 5, Line 35, delete "the" and insert -- that --, therefor.

In Column 5, Line 58, delete "user equipment 332." and insert -- user equipment 312. --, therefor.

In Column 6, Lines 18-19, delete "communication" and insert -- communicate --, therefor.

In Column 6, Line 40, delete "describe" and insert -- described --, therefor.

In Column 6, Line 45, delete "paging the user equipment" and insert -- paging of the user equipment --, therefor.

In Column 7, Line 5, delete "user equipment 332" and insert -- user equipment 312 --, therefor.

In Column 10, Line 20, delete "elements to do not" and insert -- elements do not --, therefor.

In Column 10, Line 47, delete "In the" and insert -- In this --, therefor.

In Column 11, Line 22, delete "including" and insert -- include --, therefor.

In Column 11, Line 24, delete "including" and insert -- include --, therefor.

In Column 12, Line 27, delete "form" and insert -- from --, therefor.

In Column 12, Line 30, delete "a the" and insert -- the --, therefor.

In Column 14, Line 51, delete "reasons" and insert -- of reasons --, therefor.

Signed and Sealed this
Fourteenth Day of June, 2022

Katherine Kelly Vidal
*Director of the United States Patent and Trademark Office*

In Column 14, Line 63, delete "access" and insert -- accesses --, therefor.

In Column 15, Line 27, delete "the a" and insert -- the --, therefor.

In Column 15, Line 56, delete "diagram" and insert -- diagrams --, therefor.

In Column 16, Line 52, delete "the a" and insert -- the --, therefor.

In Column 19, Line 33, delete "1414)" and insert -- 1414). --, therefor.

In Column 27, Line 51, delete "block 17120," and insert -- block 1712, --, therefor.

In Column 28, Line 67, delete "them." and insert -- of them. --, therefor.